(12) United States Patent
Rice et al.

(10) Patent No.: US 6,924,817 B2
(45) Date of Patent: Aug. 2, 2005

(54) PAINT COLOR MATCHING AND COORDINATING SYSTEM

(75) Inventors: Mary R. Rice, Laguna Niguel, CA (US); James P. Pace, Mira Loma, CA (US)

(73) Assignee: Behr Process Corporation, Santa Ana, CA (US)

( * ) Notice: Subject to any disclaimer, the term of this patent is extended or adjusted under 35 U.S.C. 154(b) by 6 days.

(21) Appl. No.: 10/383,297

(22) Filed: Mar. 6, 2003

(65) Prior Publication Data

US 2003/0174143 A1 Sep. 18, 2003

Related U.S. Application Data

(63) Continuation of application No. 09/538,664, filed on Mar. 30, 2000, now Pat. No. 6,563,510.

(51) Int. Cl.$^7$ ................................................. G09G 5/02
(52) U.S. Cl. ....................... 345/589; 345/593; 345/591; 345/597
(58) Field of Search ................................. 345/593, 589, 345/591, 597, 545, 530, 635; 382/162–167; 352/518–521; 434/98, 81, 101, 102–104; 106/456, 401, 474; 702/32; 356/402, 403, 408, 425

(56) References Cited

U.S. PATENT DOCUMENTS

| | | |
|---|---|---|
| 924,322 A | 6/1909 | Crosby |
| 1,125,078 A | 1/1915 | Dunn |
| 1,351,661 A | 8/1920 | Kaufman |

(Continued)

FOREIGN PATENT DOCUMENTS

| | | |
|---|---|---|
| CA | 769859 | 10/1967 |
| DE | 1 218 321 | 6/1966 |
| FR | 1453237 | 9/1966 |

OTHER PUBLICATIONS www.byacongroup.com Microsoft Windows 98, pp. 20–21.*
"The Principles of Color Technology" 2$^{nd}$ Edition, Billmeyer and Saltzman, p. 28.
Journal of Information Display, vol. 11, No. 6 (Jun. 1975).
Hendrickson, Herbert C. "Positional Color Coding–A Color Identification System that Combines Color and Intensity." pp. 22–25.

Primary Examiner—Matthew C. Bella
Assistant Examiner—Wesner Sajous
(74) Attorney, Agent, or Firm—Knobbe Martens; Olson & Bear LLP

(57) ABSTRACT

A paint color matching and coordinating system comprises an interface for receiving an input reference color, a processor capable of reading a memory, a memory including (1) instructions readable by the processor and (2) a database of architectural paint colors spanning all or most of the known color space, and a display generator. In use, the interface of the system receives an input reference color from a user. The processor selects a "reference paint color" from the database, the reference paint color being visually closer, with respect to color space, to the input reference color than any other paint color in the database. According to the invention, color space is divided into a plurality of fixed, generally equally sized, non-overlapping, contiguous portions, each color space portion being defined as the space of all colors within a band of hues within color space. The processor selects five sets of paint colors—one set from each of the color space portions that include the five hues that comprise the "five-way harmony" of the reference paint color. The processor may also select a sixth set of paint colors from the color space portion that includes the hue of the reference paint color. Finally, the processor directs the display generator to create a display of color samples of the reference paint color and of the first through sixth sets of paint colors.

29 Claims, 16 Drawing Sheets

(8 of 16 Drawing Sheet(s) Filed in Color)

U.S. PATENT DOCUMENTS

| | | | |
|---|---|---|---|
| 1,483,529 A | 2/1924 | Tanner | |
| 1,515,512 A | 11/1924 | Mitchell | |
| 1,529,125 A | 3/1925 | Goodwin | |
| 1,564,743 A | 12/1925 | Adler | |
| 1,593,113 A | 7/1926 | Winsche | |
| 1,630,247 A | 5/1927 | Adler | |
| 1,762,036 A | 6/1930 | Steedle | |
| 1,764,083 A | 6/1930 | Miskella | |
| 1,824,598 A | 9/1931 | Holder | |
| 2,866,277 A | 12/1958 | Wise | |
| 2,938,281 A | 5/1960 | Miller | |
| 2,988,824 A | 6/1961 | Morton | |
| 3,751,829 A | 8/1973 | Foss | |
| 4,104,809 A | 8/1978 | Day et al. | |
| 4,112,594 A | 9/1978 | Impastato | |
| 4,211,016 A | 7/1980 | Eldar | |
| 4,665,394 A | 5/1987 | Coles et al. | |
| 4,796,888 A * | 1/1989 | Louez | 446/243 |
| 4,801,267 A | 1/1989 | Von Loesch et al. | |
| 4,911,642 A | 3/1990 | Knowles | |
| 4,992,050 A | 2/1991 | Edwards | |
| 4,998,882 A | 3/1991 | Glover | |
| 5,026,286 A | 6/1991 | Hellwig | |
| 5,033,963 A | 7/1991 | Bourges | |
| 5,103,407 A | 4/1992 | Gabor | |
| 5,123,745 A | 6/1992 | Augur | |
| 5,161,974 A | 11/1992 | Bourges | |
| 5,174,758 A | 12/1992 | Abramson | |
| 5,275,566 A | 1/1994 | Yang | |
| 5,311,293 A | 5/1994 | MacFarlane et al. | |
| 5,317,678 A | 5/1994 | Okawara et al. | |
| 5,473,738 A * | 12/1995 | Hamlin et al. | 345/594 |
| 5,738,716 A | 4/1998 | Santilli et al. | |
| 5,842,866 A | 12/1998 | Chow | |
| 5,860,518 A | 1/1999 | Axelrod | |
| 5,870,091 A * | 2/1999 | Lazarony et al. | 345/804 |
| 5,909,220 A * | 6/1999 | Sandow | 345/589 |
| 5,967,562 A | 10/1999 | Tubbs et al. | |
| 6,080,209 A | 6/2000 | Wiesenfeldt et al. | |
| 6,081,253 A * | 6/2000 | Luke et al. | 345/604 |
| 6,270,123 B1 | 8/2001 | Spangler | |
| 6,343,264 B1 * | 1/2002 | Fenton et al. | 703/6 |
| D460,986 S | 7/2002 | Rice | |
| D461,508 S | 8/2002 | Rice | |
| D461,848 S | 8/2002 | Rice | |
| D462,720 S | 9/2002 | Rice | |
| 6,491,750 B1 | 12/2002 | Pace et al. | |
| 6,522,977 B2 * | 2/2003 | Corrigan et al. | 702/32 |
| 6,563,510 B1 * | 5/2003 | Rice et al. | 345/593 |
| 6,632,093 B1 * | 10/2003 | Rice et al. | 434/98 |
| 6,747,662 B2 * | 6/2004 | Masuda et al. | 345/591 |
| 2002/0089513 A1 * | 7/2002 | Blanchard et al. | 345/589 |
| 2003/0094119 A1 * | 5/2003 | Pace et al. | 106/456 |
| 2003/0231185 A1 * | 12/2003 | Kupersmit | 345/589 |

* cited by examiner

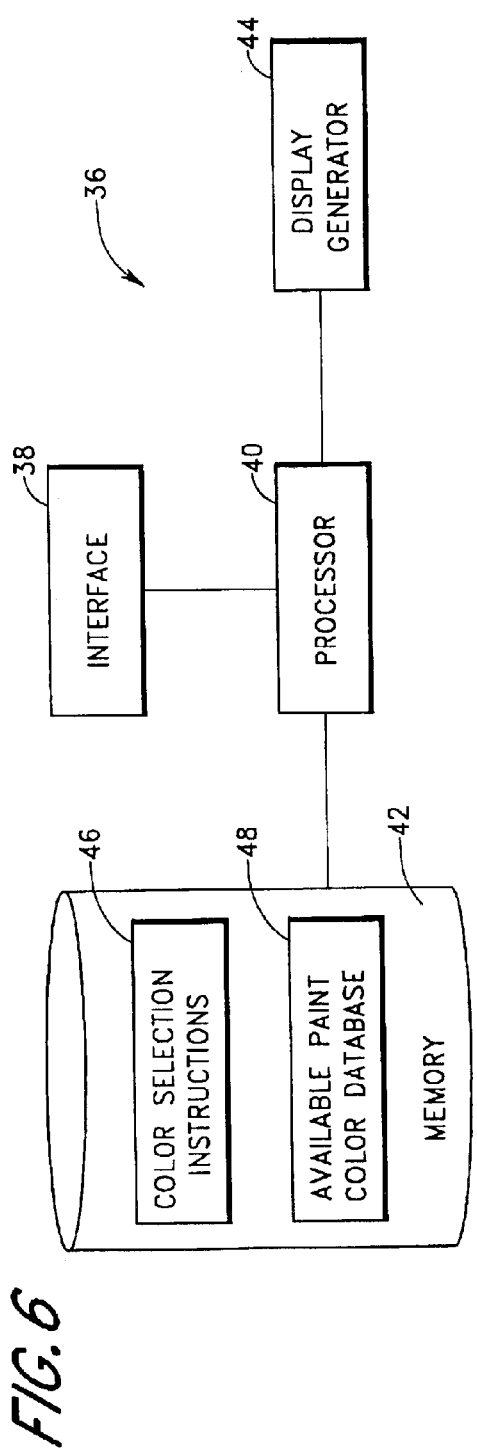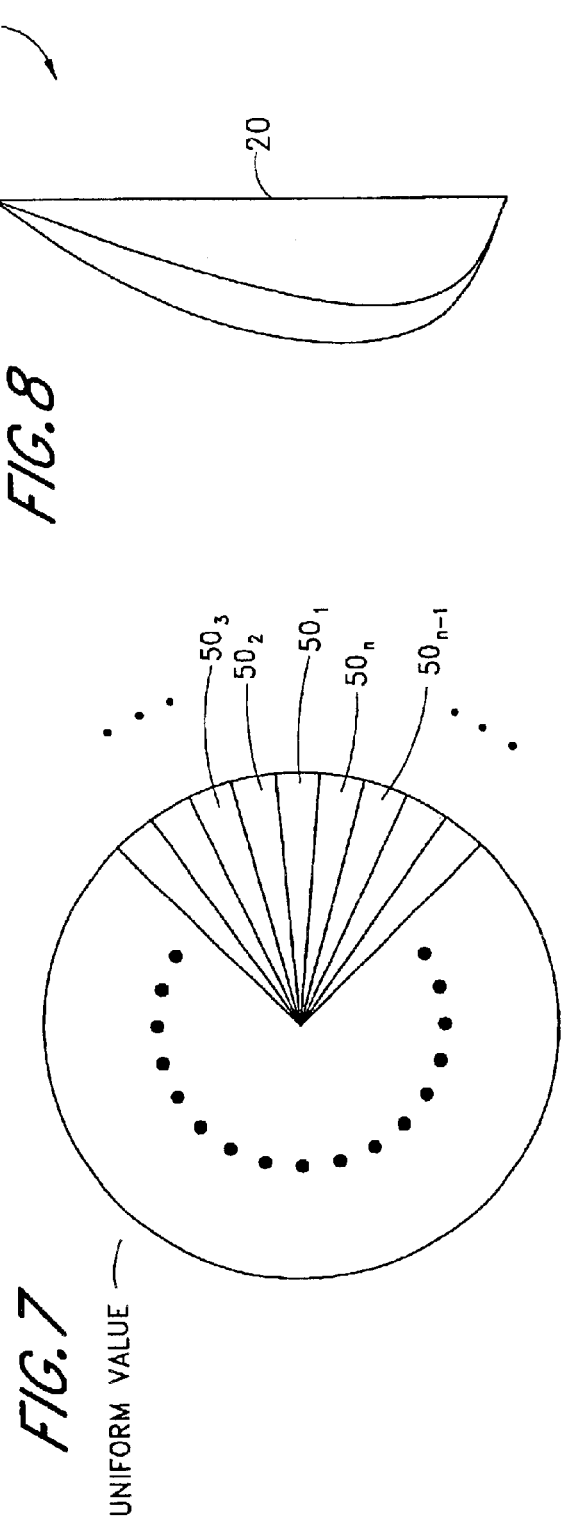

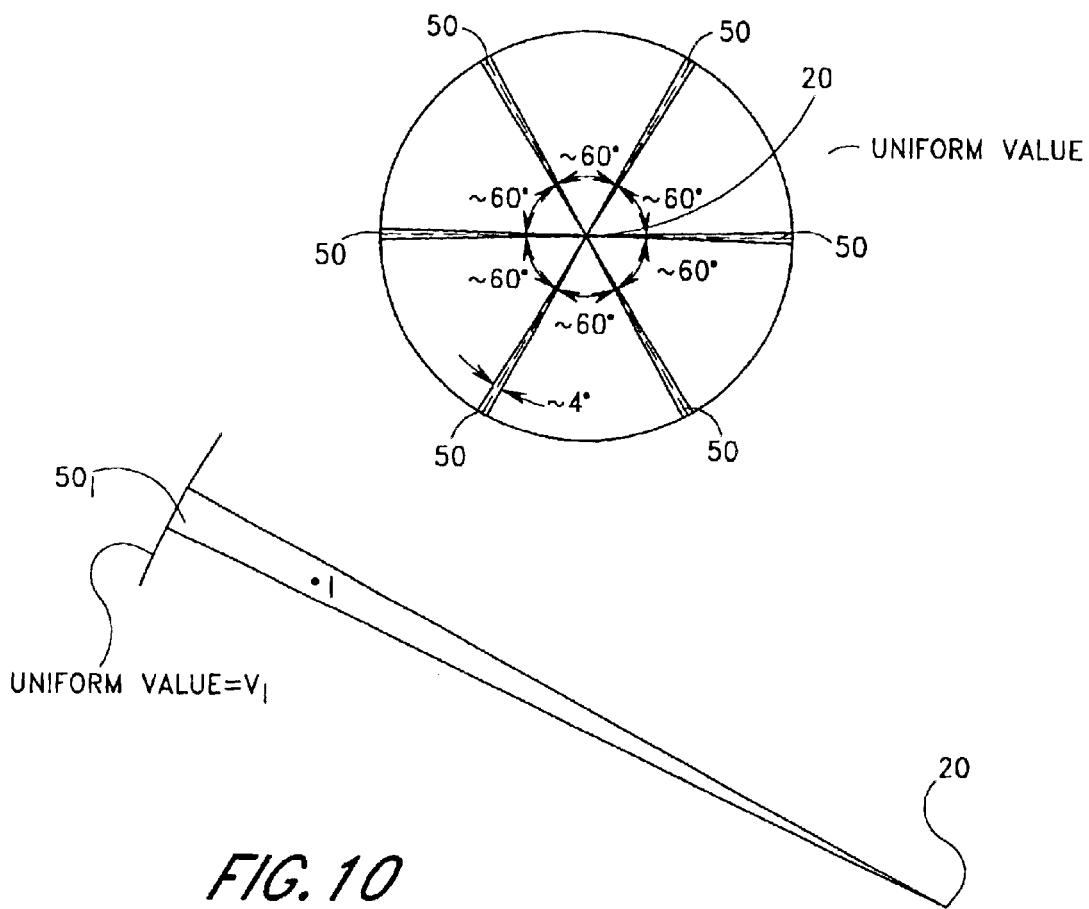
FIG. 9
FIG. 10
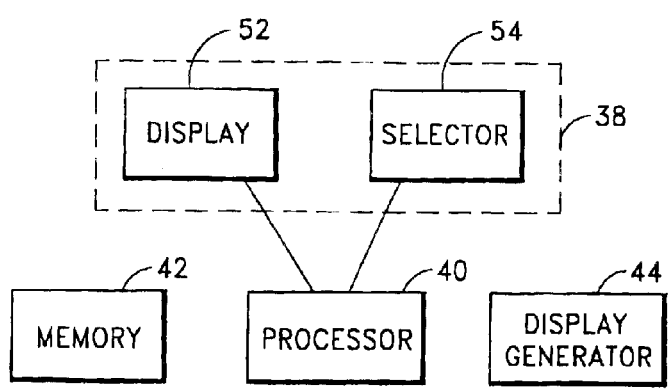
FIG. 12

US 6,924,817 B2

PAINT COLOR MATCHING AND COORDINATING SYSTEM

REFERENCE TO RELATED APPLICATION

The present application claims priority benefit under 35 U.S.C. § 120 to, and is a continuation of, U.S. patent application Ser. No. 09/538,664, filed Mar. 30, 2000, entitled "Paint Color Matching and Coordinating System, now U.S. Pat. No. 6,563,510. The foregoing utility patent application (U.S. patent application Ser. No. 09/538,664) is hereby incorporated herein by reference in its entirety.

BACKGROUND OF THE INVENTION

1. Field of the Invention

The present invention relates generally to architectural paint colors and, specifically, to an architectural paint color matching and coordinating system.

2. Description of the Related Art

Architectural paint ("house paint") is commonly provided in various colors. Paint color display systems have been developed to display various paint color samples to assist consumers in selecting paint colors. Such systems typically involve a display board, pamphlet, or book having ink-based or paint color samples.

Paint colors are sometimes referenced with respect to systems for arranging and describing color, generally referred to as color-order systems. One well-known color-order system is the Munsell system. According to the Munsell system, colors are characterized by three attributes: hue, value, and chroma. Hue is the attribute of color which is commonly described by words such as "red," "yellow," "green," "blue," "purple," etc. Value is the attribute of color which is described by the words "light," "dark," etc. Chroma is the attribute of color which is described by the words "bright," "dull," etc. For example, the colors of a tomato and a brick may be equal in hue and value, yet the colors are not identical. The difference is that the tomato is brighter, having a higher chroma.

Munsell color space is a three-dimensional space including and describing visual relationships between colors. This color space is based on a collection of actual physical samples arranged so that adjacent samples represent distinct intervals of visual color perception. Although based on physical samples, Munsell color space is theoretically capable of describing all possible colors. According to the Munsell system, color space is described with respect to three dimensions: hue, value, and chroma. Theoretically, the Munsell location of every possible color can be described by three coordinates, corresponding to the hue, value, and chroma of the given color. Although in theory Munsell color space is capable of describing all colors, it is understood that it may not be possible to create physical samples of all of the colors which could theoretically fit within Munsell color space. In particular, not all theoretical colors within the perceived Munsell color space can be made into paints.

Within Munsell color space, a vertical axis, known as the value axis, represents color value. In other words, the value (lightness/darkness) of color is determined by the vertical position within color space. Color becomes lighter as the vertical position increases. The hue of color is determined by the angular position about the vertical value axis. The various hues, i.e., shades of red, yellow, green, blue, purple, etc., are represented by vertical planes extending radially from the value axis. Moreover, every angular position about the axis, from 0° to 360°, represents a different hue. The chroma (brightness/dullness) of color is determined by the radial distance from the value axis. Color is dull (gray) near the axis and becomes brighter, or more "chromatic," as the radial distance from the value axis increases.

The Munsell system is one of a number of color-order systems based on actual physical samples. Another class of color-order systems are not based on physical samples. One of the most important of these systems is the CIE System (Commission International de l'Eclairage or International Commission on Illumination). The premise of the CIE System is that the stimulus for color is provided by a proper combination of a source of light, an object, and an observer. The CIE System describes color with reference to a standard source of illumination and a standard observer.

One widely used non-linear transformation of the CIE System is CIELAB, an opponent-type space in which color is described by three coordinates L, a, and b. In CIELAB space, L is the lightness of color (similar to Munsell value), a is a redness-greenness coordinate, and b is a yellowness-blueness coordinate.

SUMMARY OF THE INVENTION

The present invention provides an architectural paint color matching and coordinating system to assist in complementary paint color selection. The present invention recognizes that current methods of displaying complementary colors do not effectively assist the consumer in selecting complementary paint colors.

In one aspect, the present invention provides a method of generating a display or "palette" of complementary architectural paint color samples, comprising the steps of (1) receiving an input reference color having a reference hue, (2) selecting a first set of architectural paint colors having a first hue that is one of the hues comprising the five-way harmony of the reference hue, and (3) displaying color samples of the first set of architectural paint colors on one of a display monitor or a hard-copy printout.

In another aspect, the present invention provides a method of generating a display of complementary architectural paint color samples, comprising the following steps: One step is receiving an input reference color. Another step is selecting a reference paint color from a database of architectural paint colors within a color space. The reference paint color is visually closer, with respect to the color space, to the input reference color than any other paint color within the database. Each of the paint colors within the database is located within only one of a plurality of fixed non-overlapping contiguous portions of the color space. Each of the color space portions is defined as the space of all colors within a band of hues within the color space, the color space portions spanning all hues in the color space. The number of the color space portions is advantageously at least 30. Another step is determining a first of the color space portions, the first color space portion including a first hue that is one of the hues comprising the five-way harmony of the hue of the reference paint color. Another step is selecting a first set of architectural paint colors from the database, the first set being located within the first color space portion. Another step is displaying color samples of the first set of architectural paint colors on one of a display monitor or a hard-copy printout.

In another aspect, the present invention provides an architectural paint color coordination system for selecting complementary architectural paint colors, comprising an interface for receiving an input reference color, a processor configured to perform instructions read from a memory, a memory storing instructions configured to be read and performed by the processor, and a display generator. The instructions direct the processor to perform the steps of directing the interface to receive an input reference color having a reference hue, with respect to a color space; selecting a first set of architectural paint colors having a first hue that is one of the hues of the five-way harmony of the reference hue; and directing the display generator to display color samples of the first set of architectural paint colors.

In another aspect, the present invention provides an architectural paint color coordination system for selecting complementary architectural paint colors, comprising an interface for receiving an input reference color, a processor configured to perform instructions read from a memory, a memory storing instructions and a database of architectural paint colors within a color space, and a display generator. The instructions are configured to be read and performed by the processor. The instructions direct the processor to perform the following steps: The processor directs the interface to receive an input reference color. The processor selects a reference paint color from the database. The reference paint color is selected so that it is visually closer, with respect to the color space, to the input reference color than all other paint colors within the database. The paint colors within the database are grouped into a plurality of mutually exclusive sub-sets, each of which subsets of colors being located within only one of a plurality of non-overlapping contiguous portions of the color space. Each of the color space portions is defined as the space of all colors within a band of hues within the color space, the color space portions spanning all hues in the color space. The number of the color space portions is at least 30. The processor determines a first of the color space portions, the first color space portion including a first hue that is one of the hues comprising the five-way harmony of the hue of the reference paint color. The processor selects from the database a first set of architectural paint colors being located within the first color space portion. The processor directs the display generator to display color samples of the first set of architectural paint colors.

In yet another aspect, the present invention provides a method of generating a display of complementary architectural paint color samples, comprising the following steps. An input reference color is received, and a reference paint color is selected from a database of architectural paint colors within a color space. The reference paint color is closer in hue, value, and chroma to the input reference color than any other color within the database. The reference paint color has a reference hue, a reference value, and a reference chroma. For every color in the database, there is a predetermined range of hue, a predetermined range of value, and a predetermined range of chroma. These predetermined ranges include the hue, value, and chroma, respectively, of the color. A "complementary hue" is determined, which is a hue that is five-way harmonious with the reference hue. A "matching complementary color" is selected, which is defined as a color in the database that is closer to the complementary hue, the reference value, and the reference chroma than any other color in the database. First and second "offset colors" are then selected from the database. In one embodiment, the first and second offset colors have hues substantially equivalent to endpoints of the predetermined range of hue corresponding to the matching complementary color, the hues of the offset colors being within said predetermined range on opposite "sides" of the complementary hue. Also, the offset colors have value and chroma substantially equal to the reference value and reference chroma, respectively. Color samples of at least one of the first and second offset colors are then displayed on one of a display monitor or a hard-copy printout.

In another embodiment of the method just described, the first and second offset colors have values substantially equal to endpoints of the predetermined range of value corresponding to the matching complementary color. The values of the offset colors are within said predetermined range, one of such values being higher and the other being lower than the reference value. Also, the offset colors have hue and chroma substantially equal to the complementary hue and reference chroma, respectively. In yet another embodiment of the method just described, the first and second offset colors have chromas substantially equal to endpoints of the predetermined range of chroma corresponding to the matching complementary color. The chromas of the offset colors are within said predetermined range, one of such chromas being higher and the other being lower than the reference chroma. Also, the offset colors have hue and value substantially equal to the complementary hue and reference value, respectively.

In yet another aspect, the present invention provides an inventory selection system, comprising an architectural paint color selection system, a database of inventory, and a processor. The architectural paint color selection system is configured to generate an output display of harmonious paint colors and to communicate color information of such paint colors to a processor. The database of inventory contains color information of items of such inventory. The processor is in communication with the paint color selection system to read the color information of the paint colors. The processor is also in communication with the database to read the color information of the items of inventory. The processor is configured to select matching inventory from the database whose color information is within a predetermined tolerance of the color information of any of the paint colors generated by the paint color selection system. The processor is also configured to provide a listing of such matching inventory.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment(s) disclosed.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 6 is a schematic diagram of an architectural paint color matching and coordinating system of the present invention;

FIG. 7 is a uniform value cross-section of an architectural paint color space of the present invention, illustrating the division of color into a plurality of contiguous fixed non-overlapping color space portions;

FIG. 8 is a perspective view of a single color space portion according to the present invention;

FIG. 9 is a uniform value cross-section of the architectural paint color space of the present invention, showing a set of generally six-way harmonious color space portions;

FIG. 10 is a uniform value partial cross-section of the color space of the present invention, showing a single color space portion;

FIG. 12 is a schematic diagram of the architectural paint color matching and coordinating system of the present invention, illustrating one embodiment of the interface thereof;

DETAILED DESCRIPTION OF THE PREFERRED EMBODIMENT

This application hereby incorporates by reference, in its entirety, the commonly owned U.S. Pat. No. 6,632,093, entitled "Display System Facilitating Paint Color Selection and Coordination," filed on Mar. 30, 2000 (hereinafter "Display System Patent").

In general, any of a variety of color languages may be used to describe color. These languages have been developed to describe qualities which are visually perceived. The teachings and claims of this invention are directed toward that which is visually perceived, which may be described by the use of any color language. Although the invention is described with reference to a particular color language system described below, the invention is not intended to be limited to that context. In other words, it is contemplated that other color language systems could also be used to describe the present invention.

The present invention recognizes that it is useful to organize architectural paint colors with reference to hue, value, and chroma as contemplated by a theoretical color system. To describe the invention, it will be helpful to provide a context for the discussion of color, including a three-dimensional color space model and some principles concerning complementary colors.

Figure 1:
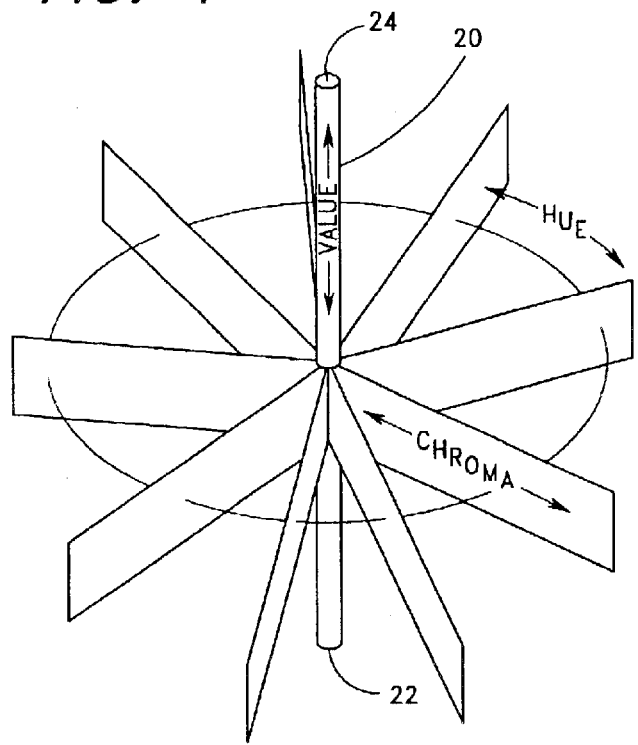
FIG. 1 is a graphical illustration of theoretical color space.

An appropriate theoretical three-dimensional color space is graphically illustrated in FIG. 1. A vertical value axis 20 is shown. The value of color, i.e., the lightness or darkness of color, is determined by the vertical position within color space. Color becomes lighter as the vertical position increases. The hue of color, i.e., the quality of color which is described by the words "red," "yellow," etc., is determined by the angular position about value axis 20. The chroma, i.e., brightness, of color is determined by the radial distance from value axis 20. Chroma is equal to 0 at the value axis 20. The color space is described below with respect to each of the individual dimensions value, hue, and chroma.

Figure 2:
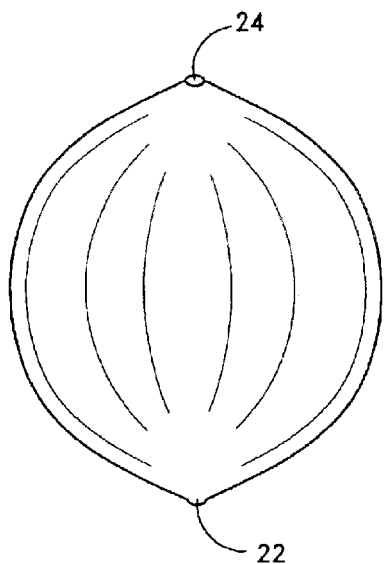
FIG. 2 is a perspective view of theoretical color space.

According to the system, color has a finite value (lightness) range. Thus, as shown in FIG. 1, value axis 20 has a finite length. By definition, the minimum value of color is 0, represented at the bottom point 22 of value axis 20, and the maximum value of color is 100, represented at the top point 24 of value axis 20. Value axis 20 represents varying lightness shades of gray, with the darker grays being nearer to the bottom of the axis and the lighter grays being nearer to the top. The bottom point 22 of value axis 20 has zero lightness and corresponds to pure black, the darkest color. Moreover, only pure black has a value equal to 0. Thus, color space converges at point 22 of value axis 20. The top point 24 of value axis 20 has maximum lightness and corresponds to pure white, the lightest color. Moreover, only pure white has a value equal to 100. Thus, color space converges at point 24 of value axis 20. Due to the convergence of color space at the endpoints 22, 24 of value axis 20, color space has a cocoon-like shape, as shown in FIG. 2.

Figure 3:
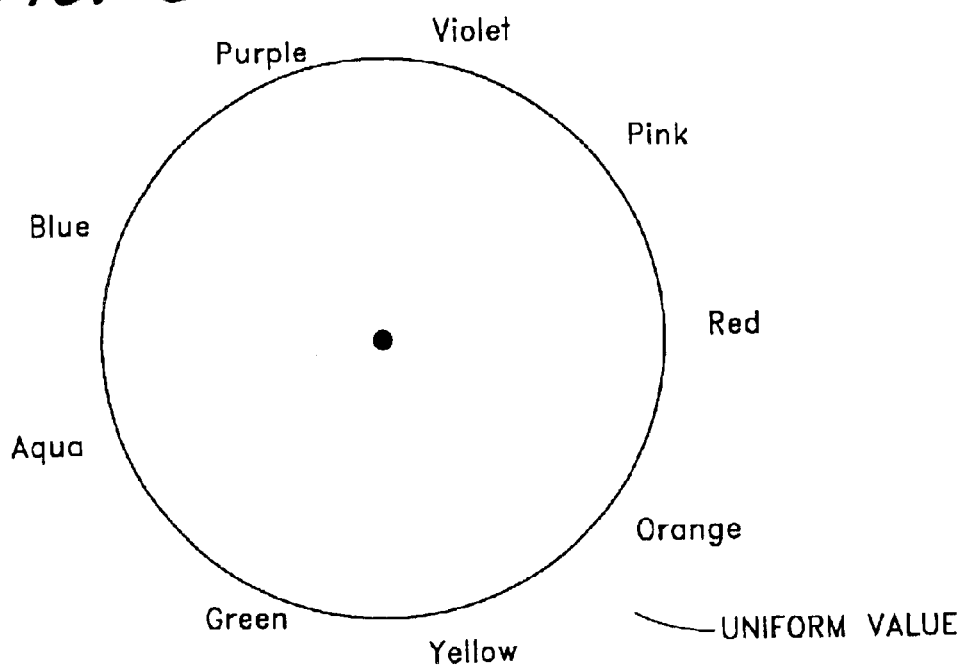
FIG. 3 is a horizontal, i.e., uniform value, cross-sectional view of theoretical color space.

According to the system, color also has a finite hue range. Color hue is limited to the angular positions spanning 0° to 360° about value axis 20. As the angular position about the axis changes, color transitions through a fixed sequence of hues. FIG. 3 shows a horizontal cross-section of color space, intersecting value axis 20 between the endpoints 22 and 24 shown in FIG. 1. In other words, FIG. 3 shows a plane within color space, having a uniform value between 0 and 100. As shown in FIG. 3, in the counter-clockwise direction about the value axis, hue transitions through the following generalized sequence: red, pink, violet, purple, blue, aqua, green, yellow, and orange. Of course, the colors indicated in FIG. 3 will be lighter or darker for different values between 0 (point 22) and 100 (point 24).

In addition to indicating variations in hue, the planar cross-section of theoretical color space represented by FIG.

3 also illustrates chromatic variations in the space. Color becomes brighter as the distance from the value axis 20 increases. Positions far from the value axis are very bright, or chromatic, while positions near the value axis are dull and more grayish. In theory, there is no limit to the possible chroma (brightness) of color having any given hue. However, in practice, color has a limited range of chroma, due to the fact that colors having chroma beyond a certain limit have not been discovered. In particular, for any given value and hue, color has a limited known chroma range. The word "known" is used to indicate that, for a given hue and value, higher chroma are not known to exist. The known chroma range is from 0 at the value axis 20 to an outer radial limit. The outer radial limit of the known chroma range varies for different values and hues. For example, a light yellow has a greater maximum known chroma than does a darker yellow. A dark red has a different maximum known chroma than does a light blue.

Figure 4:
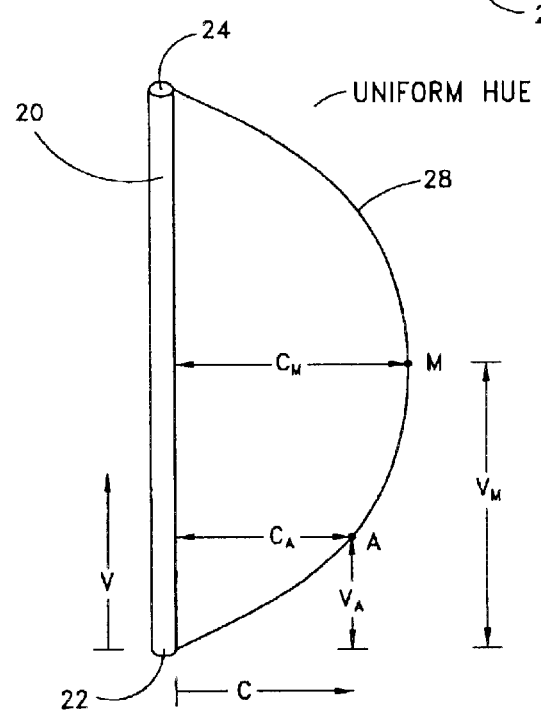
FIG. 4 is a uniform hue plane of theoretical color space.

FIG. 4 illustrates the varying known chroma range of color in the theoretical color space. FIG. 4 shows a uniform hue plane of the space, i.e., a "slice" of color space corresponding to a single hue. In particular, a vertical plane is shown passing through the value axis 20 and extending radially outward therefrom. This is essentially a known chroma range profile for a given hue. The profile shown in FIG. 4 is typical of most hues within color space. As shown, the uniform hue plane has a straight edge, corresponding to the value axis 20, and a curved edge 28 corresponding to the highest known chroma for any given value. For example, consider a point A on the curved edge 28. Point A has a value $V_A$ and a chroma $C_A$. Thus, at the value $V_A$, the highest known chroma within the displayed hue plane of the space is $C_A$. Within the uniform hue plane, the known chroma range varies with value. At the bottom of the value axis, the known chroma range converges at the point 22. As the value increases, the known chroma range becomes larger. The maximum known chroma range within the displayed hue plane is at the value $V_M$, at which the known chroma ranges from zero at the value axis to $C_M$ on the line 28. The point M corresponds to the brightest color having the hue of the uniform hue plane. As the value increases above $V_M$, the known chroma range decreases. At the top of the value axis, the known chroma range converges at the point 24. It is understood that in practice it may not be possible to create all of the more chromatic colors of a given hue, particularly for architectural paints.

Figure 5:
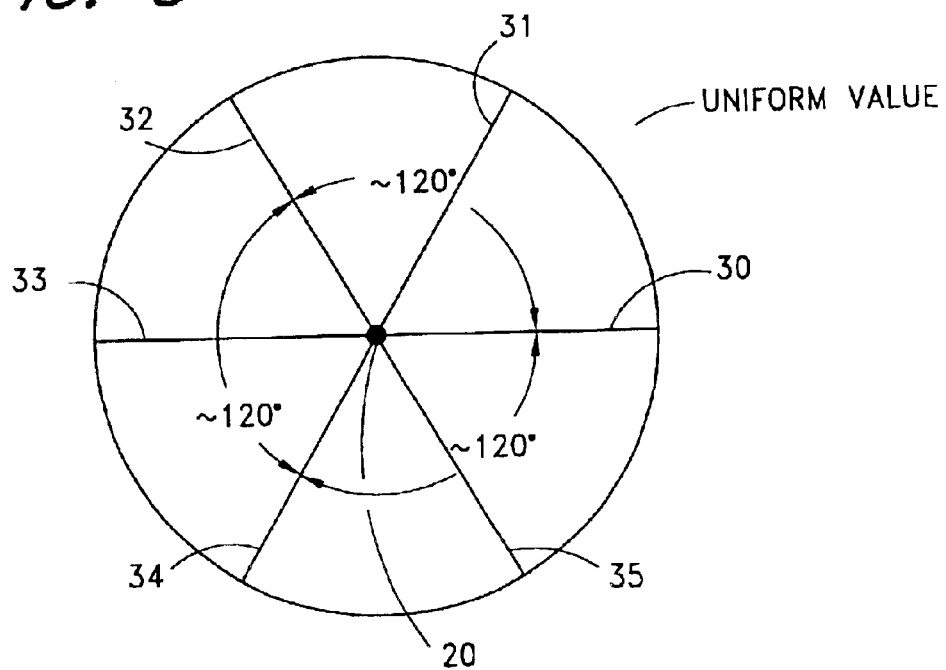
FIG. 5 is a uniform value cross-section of theoretical color space, showing a set of six-way harmonious hues.

For any given reference hue there exists a set of five complementary hues. This set is referred to as the "five-way harmony" of the reference hue. FIG. 5 is a uniform value cross-section of theoretical color space depicting the entire spectrum of hues. FIG. 5 graphically illustrates the five-way harmony of a reference hue represented by the line 30 extending radially outward from the value axis 20. The hues comprising the five-way harmony are those hues that are angularly displaced from the reference hue, line 30, by 60°, 120°, 180°, 240°, and 300° about the value axis 20. In FIG. 5, the hues comprising the five way-harmony of the reference hue, line 30, are represented by lines 31, 32, 33, 34, and 35. More generally, any five of the hues 30, 31, 32, 33, 34, and 35 comprise the five-way harmony of the sixth hue from this set. For convenience, any set of six hues that are angularly displaced in increments of 60° about the value axis 20 will be referred to herein as a "six-way harmony," and will be described as "six-way harmonious." The hues represented by lines 32 and 34, i.e., the hues that are angularly displaced from the reference hue 30 by 120° and 240° about the value axis 20, are known as "split-complements" of the reference hue. The set of lines 30, 32, and 34 graphically represent "split-complementary" hues. Six-way harmonious hues and split-complementary hues are understood to be aesthetically pleasing when displayed together. The term "complementary" will be used herein to mean five-way harmonious.

Figure 21:
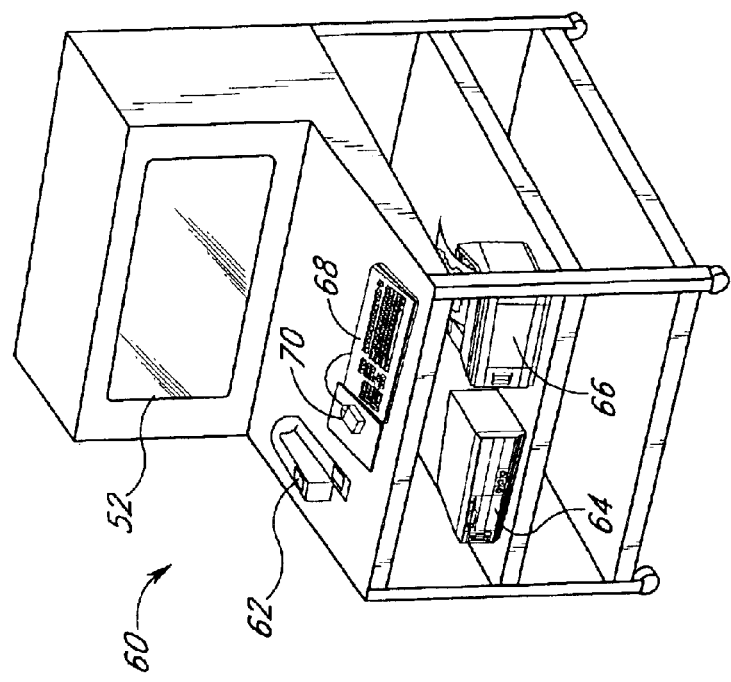
FIG. 21 is a perspective view of one embodiment of an in-store kiosk version of the system of the present invention.

FIG. 6 schematically shows an architectural paint color matching and coordinating system 36 of the present invention. The system 36 comprises an interface 38, a processor 40, a memory 42 storing instructions 46 and a database 48 of color information of architectural paint colors, and a display generator 44, such as a television monitor or a printer. The color information stored in the database 48 may comprise reference coordinates describing the locations of the stored paint colors, with respect to any color-order system. The color information may comprise hue, value, and chroma or CIELAB coordinates, or the appropriate identifiers for any other color identification system for the paint colors. In a preferred embodiment, the color information advantageously comprises D65 CIELAB identifiers for all the stored paint colors. In use, the system 36 receives an input reference color from a user and generates an output display having color samples of various matching and complementary architectural paint colors. Specifically, the display includes color samples from the five-way harmony of the input reference color. The system 36 may be advantageously used in a retail environment to assist consumers in architectural paint color selection and coordination of complementary architectural paint colors. In one embodiment, the system 36 is configured as an in-store kiosk, as shown in FIG. 21, described below.

In accordance with the invention, a database 48 of about 65,000 architectural paint colors has been created, spanning a wide range of hue, value, and chroma. These paint color samples form an independent color space which is the basis for an architectural paint color display system described in the above-identified Display System Patent. These paint color samples have been arranged according to the guiding principle that adjacent samples should represent equal intervals of visual color perception. In a preferred embodiment, these paint color samples are arranged in accordance with the general dimensions of the theoretical color space outlined above. In other words, the samples are arranged with reference to a vertical value axis 20, with chroma varying with the radial distance from the value axis and value varying with the vertical position relative to the value axis.

Preferably, the color space defined by the architectural paint colors included within the database 48 spans the entire visible spectrum of hues which are known to exist and are represented within currently known color-order systems. Optionally, the database 48 may exclude those colors for which architectural paints are not useful or desirable. For example, architectural paint colors having very low chroma (dull) or very high (light) or very low (dark) value are generally unused and, thus, are preferably excluded from the database 48. The system 36 uses the database 48 to select a reference paint color and to select complementary paint colors, as described below.

FIG. 7 shows a uniform value cross-section of the color space of the present invention, illustrating a plurality of fixed non-overlapping contiguous portions 50 of color space. Each of these color space portions 50 is defined as the space of all colors within a band of hues within the color space. The color space portions 50 preferably span all hues in the color space. Preferably, the hue spans of the portions 50 vary, so that each portion represents a visually meaningful and generally distinct family of colors. Alternatively, all of the portions 50 may span an equally sized range of hues. FIG. 8 is a perspective view of a color space portion 50. As shown in FIG. 8, the color space portion 50 resembles a narrow curved wedge converging at the value axis 20.

Preferably, the number of color space portions 50 is sufficiently high so that each portion has a perceptually uniform hue. In other words, the portions 50 are preferably narrow so that a viewer cannot perceive large differences between colors of different hue within a single portion 50. An advantage of having narrow color space portions is that each portion may represent a nearly uniform hue. There are preferably at least 30 color space portions 50, in which case the mean hue span of the color space portions 12° about the value axis 20. In another preferred embodiment, there are 90 color space portions 50, in which case the mean hue span of the color space portions is 4° about the value axis 20. In yet another preferred embodiment, there are 91 color space portions, but only 84 are used in the paint color matching and coordinating system of the present invention, described below. Seven of the color space portions are not used because they represent colors which have a high degree of perceptual similarity to adjacent color space portions, and are thus difficult to distinguish.

Figure 23:
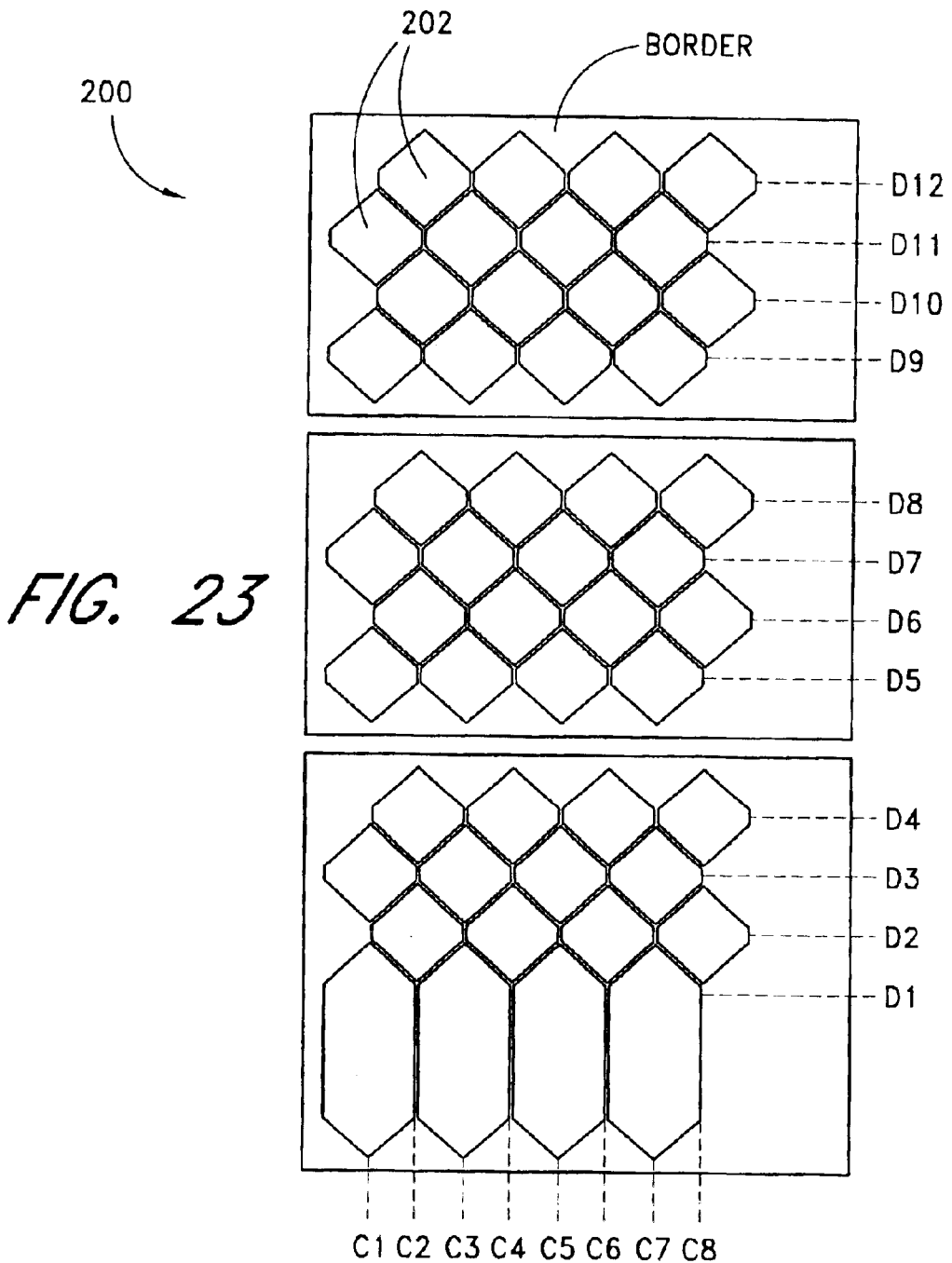
FIG. 23 shows one embodiment of a paint color display card of a paint color display system usable in conjunction with the paint color matching and coordinating system of the present invention.

FIG. 23 is one embodiment of a set of paint color display cards 200 of the paint color display system described in the Display System Patent, usable in conjunction with the paint color matching and coordinating system of the present invention. The display cards 200 preferably include a two-dimensional array of architectural paint color samples substantially spanning one of the 90 color space portions 50 of the preferred embodiment of the present invention. The paint color samples are colors from the architectural paint color database described above. In one dimension of the two-dimensional array, the display cards show an increasing value, while in the other dimension the display cards show an increasing chroma. In the illustrated embodiment, cards 200 include 48 paint color samples 202. The dotted lines and labels (C1, C2 . . . and D1, D2, . . . ) indicate the card positions of each of the color samples. For example, the bottom-left sample is located at (C1, D1).

Tables 1 and 2, below, provide two examples of a suitable selection of architectural paint colors for one or more paint color display cards or other display pattern or arrangement usable in conjunction with the paint color matching and coordinating system of the invention. These tables each list a selection of paint colors and their corresponding coordinates (C1, D1, etc.) according to the arrangement of color samples shown on the display cards 200 of FIG. 23. The colors are identified by D65 CIELab coordinates (L, a, b), as known in the art. Each table describes a display having a two-dimensional array of paint color samples. In particular, the arrays have an increasing value in one dimension and an increasing chroma in the other dimension. Moreover, all adjacent samples represent substantially equal intervals of visual color perception.

Also, each set of display cards 200 includes a border color surrounding the above-mentioned color samples. The border color is preferably the same color as, or similar to, the high chroma color corresponding to the color space portion represented by the display card. Tables 1 and 2 also indicate the D65 CIELab coordinates for the border color of each represented card.

TABLE 1

First Example of Sample Paint Colors on a Display Card as in FIG. 23

| Position | Position | L | a | b |
|---|---|---|---|---|
| Border | Border | 56.576 | −48.668 | 15.151 |
| C1 | D1 | 95.749 | −7.166 | 1.807 |
| C1 | D11 | 43.196 | −42.056 | 13.155 |
| C1 | D3 | 90.585 | −17.469 | 2.849 |
| C1 | D5 | 84.034 | −27.784 | 5.182 |
| C1 | D7 | 73.922 | −40.652 | 10.098 |
| C1 | D9 | 61.145 | −48.165 | 14.571 |
| C2 | D10 | 52.054 | −37.281 | 10.160 |
| C2 | D12 | 35.518 | −28.277 | 7.976 |
| C2 | D2 | 92.171 | −10.794 | 1.542 |
| C2 | D4 | 86.755 | −18.254 | 2.427 |
| C2 | D6 | 78.867 | −29.947 | 5.492 |
| C2 | D8 | 67.686 | −39.256 | 10.346 |
| C3 | D1 | 94.706 | −6.558 | 1.931 |
| C3 | D11 | 42.292 | −23.375 | 4.500 |
| C3 | D3 | 88.570 | −11.952 | 1.215 |
| C3 | D5 | 82.123 | −20.097 | 2.805 |
| C3 | D7 | 71.652 | −31.148 | 6.967 |
| C3 | D9 | 57.049 | −33.736 | 8.383 |
| C4 | D10 | 51.271 | −24.808 | 4.268 |
| C4 | D12 | 34.956 | −15.711 | 2.195 |
| C4 | D2 | 90.970 | −7.728 | 1.216 |
| C4 | D4 | 84.856 | −12.766 | 1.207 |
| C4 | D6 | 77.345 | −20.179 | 2.717 |
| C4 | D8 | 66.829 | −30.498 | 6.788 |
| C5 | D1 | 94.045 | −4.514 | 1.306 |
| C5 | D11 | 42.301 | −15.153 | 0.829 |
| C5 | D3 | 87.282 | −8.594 | 0.970 |
| C5 | D5 | 80.754 | −14.712 | 1.469 |
| C5 | D7 | 72.367 | −22.851 | 4.401 |
| C5 | D9 | 57.358 | −24.761 | 4.259 |
| C6 | D10 | 51.707 | −16.988 | 0.832 |
| C6 | D12 | 35.695 | −10.496 | −0.340 |
| C6 | D2 | 89.998 | −5.509 | 1.167 |
| C6 | D4 | 83.506 | −8.662 | 0.624 |
| C6 | D6 | 76.980 | −16.982 | 1.927 |
| C6 | D8 | 66.243 | −21.840 | 3.132 |
| C7 | D1 | 93.647 | −2.596 | 1.419 |
| C7 | D11 | 42.885 | −9.746 | −1.499 |
| C7 | D3 | 86.317 | −5.672 | 0.418 |
| C7 | D5 | 79.709 | −9.711 | 0.881 |
| C7 | D7 | 72.597 | −15.354 | 2.533 |
| C7 | D9 | 57.311 | −16.843 | 1.105 |
| C8 | D10 | 52.153 | −10.418 | −1.586 |
| C8 | D12 | 36.436 | −6.580 | −2.179 |
| C8 | D2 | 89.581 | −3.353 | 0.812 |
| C8 | D4 | 82.522 | −5.182 | 0.392 |
| C8 | D6 | 76.869 | −11.096 | 0.721 |
| C8 | D8 | 66.442 | −14.295 | 0.305 |

TABLE 2

Second Example of Sample Paint Colors on a Display Card as in FIG. 23

| C | D | L | a | b |
|---|---|---|---|---|
| Border | Border | 66.584 | −43.148 | 2.994 |
| C1 | D1 | 95.136 | −7.424 | 0.110 |
| C1 | D11 | 33.473 | −31.330 | 7.197 |
| C1 | D3 | 90.924 | −15.407 | −0.856 |
| C1 | D5 | 82.830 | −27.128 | −0.753 |
| C1 | D7 | 66.398 | −43.051 | 3.610 |
| C1 | D9 | 46.500 | −41.962 | 5.264 |
| C2 | D10 | 38.607 | −34.256 | 4.548 |
| C2 | D12 | 30.267 | −20.923 | 3.679 |
| C2 | D2 | 93.675 | −10.791 | −0.024 |
| C2 | D4 | 88.150 | −19.789 | −1.128 |
| C2 | D6 | 75.565 | −36.065 | 1.055 |
| C2 | D8 | 58.542 | −45.571 | 4.899 |
| C3 | D1 | 94.824 | −6.660 | 0.067 |
| C3 | D11 | 29.601 | −14.338 | −0.047 |
| C3 | D3 | 90.667 | −13.307 | −1.020 |

TABLE 2-continued

Second Example of Sample Paint Colors on a Display Card as in FIG. 23

| C | D | L | a | b |
|---|---|---|---|---|
| C3 | D5 | 82.118 | −23.691 | −0.935 |
| C3 | D7 | 64.555 | −35.222 | 1.376 |
| C3 | D9 | 43.850 | −28.705 | 0.827 |
| C4 | D10 | 36.768 | −16.472 | −1.740 |
| C4 | D12 | 29.026 | −10.799 | −1.279 |
| C4 | D2 | 93.105 | −8.140 | −0.203 |
| C4 | D4 | 86.777 | −13.702 | −1.049 |
| C4 | D6 | 72.518 | −25.597 | −0.865 |
| C4 | D8 | 56.538 | −31.050 | 0.389 |
| C5 | D1 | 93.417 | −5.240 | −0.031 |
| C5 | D11 | 30.394 | −9.510 | −2.184 |
| C5 | D3 | 89.199 | −9.527 | −1.183 |
| C5 | D5 | 80.583 | −17.951 | −1.596 |
| C5 | D7 | 62.505 | −25.430 | −1.163 |
| C5 | D9 | 43.862 | −18.699 | −2.203 |
| C6 | D10 | 36.823 | −10.731 | −3.143 |
| C6 | D12 | 27.887 | −6.495 | −2.125 |
| C6 | D2 | 92.564 | −5.956 | −0.201 |
| C6 | D4 | 85.674 | −10.032 | −1.205 |
| C6 | D6 | 71.846 | −19.503 | −1.294 |
| C6 | D8 | 55.865 | −22.195 | −1.808 |
| C7 | D1 | 92.490 | −4.861 | −0.087 |
| C7 | D11 | 31.368 | −6.729 | −3.031 |
| C7 | D3 | 88.796 | −6.741 | −0.663 |
| C7 | D5 | 80.111 | −13.123 | −1.493 |
| C7 | D7 | 62.234 | −17.994 | −2.818 |
| C7 | D9 | 44.176 | −12.402 | −3.521 |
| C8 | D10 | 37.387 | −6.881 | −3.912 |
| C8 | D12 | 30.148 | −6.445 | −2.819 |
| C8 | D2 | 92.122 | −4.362 | −0.111 |
| C8 | D4 | 84.756 | −6.862 | −1.081 |
| C8 | D6 | 70.551 | −12.951 | −1.706 |
| C8 | D8 | 56.322 | −15.063 | −3.212 |

As mentioned above, in one preferred embodiment, the color space is divided into 91 color space portions, but only 84 are displayed. Each color space portion includes one "high-chroma color" that is substantially the most chromatic color therein. The complete set of high-chroma colors generally describes how the color space has been particularly divided into a set of distinct color space portions. Table 3, below, identifies a complete set of 91 high-chroma colors for a division of the color space into 91 distinct color space portions ("CSPs"), according to the above-mentioned preferred embodiment of the invention. In particular, the high-chroma colors are identified by D65 CIELab coordinates (L, a, b) and also by Lch (L, c, h) coordinates, as known in the art. The color information for ma colors within the seven non-displayed color space portions is italicized.

TABLE 3

High Chroma Color for Each Color Space Portion (CSP)

| CSP | L | a | b | c | h |
|---|---|---|---|---|---|
| 1 | 86.054 | −4.396 | 84.807 | 84.920 | 92.967 |
| 2 | 81.947 | −9.799 | 78.475 | 79.084 | 97.117 |
| 3 | 79.065 | −18.438 | 74.278 | 76.533 | 103.940 |
| 4 | 75.986 | −27.793 | 68.528 | 73.950 | 112.076 |
| 5 | 73.891 | −32.697 | 64.524 | 72.335 | 116.873 |
| 6 | 71.705 | −35.644 | 61.676 | 71.235 | 120.025 |
| 7 | 67.049 | −43.533 | 54.368 | 69.649 | 128.685 |
| 8 | 65.407 | −45.240 | 51.483 | 68.536 | 131.307 |
| 9 | 64.057 | −46.633 | 48.156 | 67.035 | 134.080 |
| 10 | 62.030 | −48.333 | 44.602 | 65.769 | 137.299 |
| 11 | 60.439 | −49.898 | 41.262 | 64.748 | 140.411 |
| 12 | 59.248 | −50.507 | 37.121 | 62.681 | 143.685 |
| 13 | 57.691 | −50.791 | 30.603 | 59.299 | 148.930 |

TABLE 3-continued

High Chroma Color for Each Color Space Portion (CSP)

| CSP | L | a | b | c | h |
|---|---|---|---|---|---|
| 14 | 58.241 | −50.335 | 23.836 | 55.694 | 154.660 |
| 15 | 56.924 | −49.450 | 19.510 | 53.159 | 158.469 |
| 16 | 57.461 | −48.047 | 14.182 | 50.097 | 163.555 |
| 17 | 55.569 | −45.485 | 7.688 | 46.131 | 170.407 |
| *18* | *57.580* | *−45.338* | *6.170* | *45.756* | *172.250* |
| 19 | 56.795 | −44.726 | 4.459 | 44.948 | 174.306 |
| 20 | 55.238 | −43.486 | 0.840 | 43.494 | 178.893 |
| 21 | 56.676 | −40.998 | −6.136 | 41.455 | 188.512 |
| 22 | 54.613 | −39.564 | −9.046 | 40.585 | 192.879 |
| 23 | 62.586 | −36.794 | −15.187 | 39.805 | 202.428 |
| 24 | 61.489 | −34.467 | −20.109 | 39.904 | 210.261 |
| 25 | 61.099 | −30.921 | −25.878 | 40.321 | 219.926 |
| 26 | 60.356 | −28.029 | −30.395 | 41.346 | 227.318 |
| *27* | *60.182* | *−25.986* | *−33.232* | *42.186* | *231.976* |
| 28 | 60.676 | −23.517 | −36.587 | 43.493 | 237.269 |
| 29 | 60.406 | −22.653 | −36.876 | 43.278 | 238.438 |
| 30 | 59.806 | −21.626 | −37.276 | 43.095 | 239.880 |
| 31 | 59.372 | −20.903 | −37.610 | 43.028 | 240.936 |
| 32 | 59.017 | −19.480 | −38.020 | 42.720 | 242.872 |
| 33 | 58.386 | −15.985 | −39.048 | 42.193 | 247.738 |
| 34 | 48.826 | −9.602 | −40.920 | 42.032 | 256.794 |
| 35 | 47.485 | −7.371 | −41.735 | 42.381 | 259.984 |
| 36 | 47.219 | −5.449 | −42.456 | 42.805 | 262.686 |
| 37 | 45.720 | −3.127 | −42.715 | 42.830 | 265.813 |
| 38 | 43.564 | 1.180 | −39.786 | 39.804 | 271.699 |
| 39 | 42.996 | 4.214 | −37.900 | 38.133 | 276.345 |
| 40 | 43.621 | 6.256 | −36.360 | 36.894 | 279.763 |
| 41 | 42.681 | 7.274 | −35.411 | 36.150 | 281.608 |
| 42 | 43.164 | 9.235 | −34.614 | 35.825 | 284.939 |
| 43 | 43.262 | 10.620 | −33.786 | 35.415 | 287.449 |
| *44* | *42.555* | *12.339* | *−32.438* | *34.706* | *290.827* |
| 45 | 42.235 | 13.179 | −32.077 | 34.678 | 292.336 |
| 46 | 42.726 | 14.434 | −31.048 | 34.239 | 294.934 |
| 47 | 42.335 | 17.218 | −29.386 | 34.059 | 300.368 |
| 48 | 47.119 | 20.297 | −27.396 | 34.096 | 306.534 |
| 49 | 44.225 | 20.354 | −27.345 | 34.089 | 306.662 |
| 50 | 45.124 | 22.342 | −26.617 | 34.751 | 310.010 |
| 51 | 49.329 | 25.949 | −24.411 | 35.627 | 316.750 |
| 52 | 48.755 | 29.612 | −21.498 | 36.593 | 324.021 |
| 53 | 49.692 | 34.983 | −18.751 | 39.691 | 331.808 |
| 54 | 47.939 | 38.418 | −16.414 | 41.778 | 336.865 |
| 55 | 47.895 | 45.914 | −11.801 | 47.407 | 345.586 |
| 56 | 47.059 | 47.225 | −8.361 | 47.959 | 349.960 |
| 57 | 50.455 | 48.554 | −6.377 | 48.971 | 352.518 |
| 58 | 39.451 | 49.821 | 18.841 | 53.264 | 20.715 |
| 59 | 41.654 | 52.211 | 22.428 | 56.825 | 23.247 |
| *60* | *42.251* | *52.719* | *27.394* | *59.411* | *27.457* |
| 61 | 42.968 | 52.191 | 28.486 | 59.459 | 28.626 |
| 62 | 43.844 | 52.614 | 31.005 | 61.070 | 30.510 |
| 63 | 44.508 | 53.376 | 33.336 | 62.931 | 31.987 |
| 64 | 45.388 | 54.976 | 36.021 | 65.725 | 33.233 |
| 65 | 46.012 | 54.709 | 36.382 | 65.701 | 33.624 |
| 66 | 46.574 | 56.164 | 37.746 | 67.669 | 33.904 |
| 67 | 47.366 | 55.820 | 38.396 | 67.751 | 34.522 |
| *68* | *51.133* | *58.007* | *40.163* | *70.554* | *34.698* |
| 69 | 48.189 | 56.519 | 42.529 | 70.733 | 36.960 |
| 70 | 50.774 | 57.315 | 44.359 | 72.475 | 37.738 |
| 71 | 51.808 | 57.225 | 46.231 | 73.566 | 38.934 |
| 72 | 54.754 | 57.449 | 51.897 | 77.418 | 42.093 |
| 73 | 56.010 | 56.091 | 53.142 | 77.268 | 43.454 |
| 74 | 56.558 | 54.293 | 53.471 | 76.203 | 44.563 |
| 75 | 58.058 | 52.498 | 55.338 | 76.278 | 46.508 |
| 76 | 59.550 | 51.089 | 56.967 | 76.520 | 48.114 |
| 77 | 61.405 | 48.632 | 60.152 | 77.352 | 51.045 |
| 78 | 63.604 | 46.489 | 63.972 | 79.080 | 53.994 |
| 79 | 64.266 | 45.492 | 65.088 | 79.411 | 55.049 |
| 80 | 67.252 | 40.718 | 68.992 | 80.112 | 59.451 |
| 81 | 69.032 | 37.488 | 72.376 | 81.509 | 62.617 |
| 82 | 73.777 | 29.357 | 80.145 | 85.352 | 69.882 |
| 83 | 74.317 | 27.964 | 81.627 | 86.284 | 71.089 |
| 84 | 75.228 | 26.063 | 82.921 | 86.921 | 72.551 |
| 85 | 77.617 | 20.689 | 85.263 | 87.737 | 76.361 |
| 86 | 78.691 | 17.243 | 87.015 | 88.707 | 78.791 |
| 87 | 79.900 | 14.013 | 87.940 | 89.050 | 80.946 |
| 88 | 81.522 | 8.228 | 90.741 | 91.113 | 84.819 |

TABLE 3-continued

High Chroma Color for Each Color Space Portion (CSP)

| CSP | L | a | b | c | h |
|-----|---|---|---|---|---|
| 89 | 81.975 | 7.163 | 90.039 | 90.323 | 85.451 |
| 90 | 81.940 | 6.027 | 88.580 | 88.785 | 86.107 |
| 91 | 82.771 | 3.659 | 87.973 | 88.049 | 87.618 |

As mentioned above, colors having hues which are angularly separated by increments of 60° about the value axis 20 are six-way harmonious. Colors having hues separated by increments of approximately 60° are "nearly six-way harmonious" and exhibit substantially the same aesthetic benefits of harmony when displayed together. Narrow color space portions 50 which are angularly separated by approximately 60°, 120°, 180°, 240°, or 300°, as shown in FIG. 9, are described herein as "generally six-way harmonious." Colors within generally six-way harmonious color space portions 50 are at least nearly, if not exactly, six-way harmonious. In other words, any color within one of said generally six-way harmonious color space portions 50, shown in FIG. 9, is at least nearly six-way harmonious with any color within another of said generally six-way harmonious color space portions 50.

All of the paint colors in the database 48 are graphically located within one of the portions 50 of the present invention. For each paint color, the database 48 preferably includes an identification of the color space portion 50 within which the paint color is located. FIG. 10 illustrates this concept. Suppose the database 48 includes a paint color graphically represented in the color space of the present invention by the point I having a value $V_I$. FIG. 10 is a partial cross-section of the color space having a uniform value equal to $V_I$, the point I is graphically located within a color space portion $50_I$ within the color space. Preferably, in addition to storing the paint color represented by the point I, the database stores a linked identification of the color space portion $50_I$. Thus, for any paint color, such as point I, the processor 40 can determine the color space portion thereof, such as portion $50_I$, simply by reading this information from the memory 42.

The interface 38 of the system 36 is configured to receive an "input reference color" from the user. This is a color that the user provides. The input reference color can be any color. The system 36 then determines a "reference paint color," which is the architectural paint color from the database 48 that most closely matches the input reference color. The system uses the reference paint color as a reference to generate complementary paint colors, as described below.

The interface 38 is preferably configured to allow the user to select an input reference color in several ways. First, the user can select the input reference color from a video or physical display of architectural paint colors. Second, the user can identify the input reference color by inputting a color identification, such as (1) a color identification code that describes the input reference color with respect to a known color-reference system or color database, or (2) a common color name (e.g., "Blush"). Third, the user can scan the input reference color into the system 36 from a physical specimen, such as a cloth, paper, carpet, painting, photograph, curtain, painted wood piece, etc. These aspects of the interface 38 are described in greater detail below. Depending on the method by which the user selects the input reference color, the input reference color and the reference paint color may be the exact same color.

Figure 11:
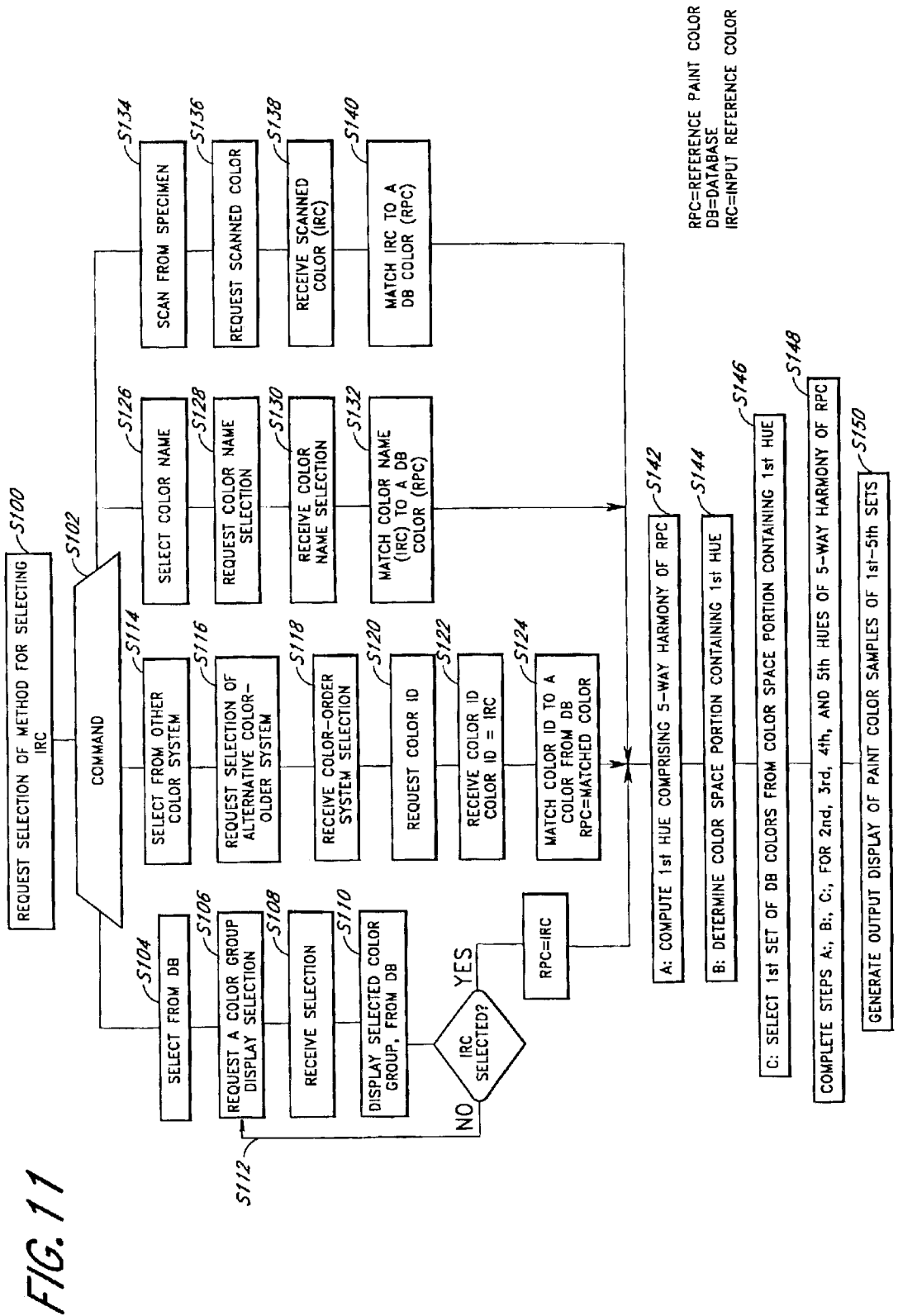
FIG. 11 is a flowchart diagram showing one embodiment of a control program for the system of the present invention.

FIG. 11 illustrates one embodiment of a control program for the system 36. Accordingly, the user and the processor 40 communicate through the interface 38 (FIG. 12). Initially, when a user initiates a session, the processor 40 requests that the user select one of the available methods of selecting an input reference color (step 100). Once in the command state, 102, the user then chooses an input reference color selection method, one of steps 104, 114, 126, or 134.

As mentioned above, according to one selection method of the system 36, the user can select an input reference color from a display of architectural paint colors (step 104). Preferably, the interface 38 may advantageously comprise an architectural paint color display 52 and a selector 54, as indicated in FIG. 12. The display 52 displays color samples of architectural paint colors to the user. These paint colors are preferably the paint colors stored within the database 48, in which case the input reference color selected by the user is also the reference paint color. Any of a variety of different types of displays can be used, such as boards, pamphlets, or a monitor, keeping in mind the goal of displaying architectural paint colors. The selector 54 is a device which allows the user to select the input reference color from among the colors displayed on the display 52. Any of a variety of different types of selectors can be used, such as a keyboard, mouse, or touch-screen display, giving due consideration to the goals of conveniently selecting a paint color and, optionally, operating a selection program.

Figure 13:
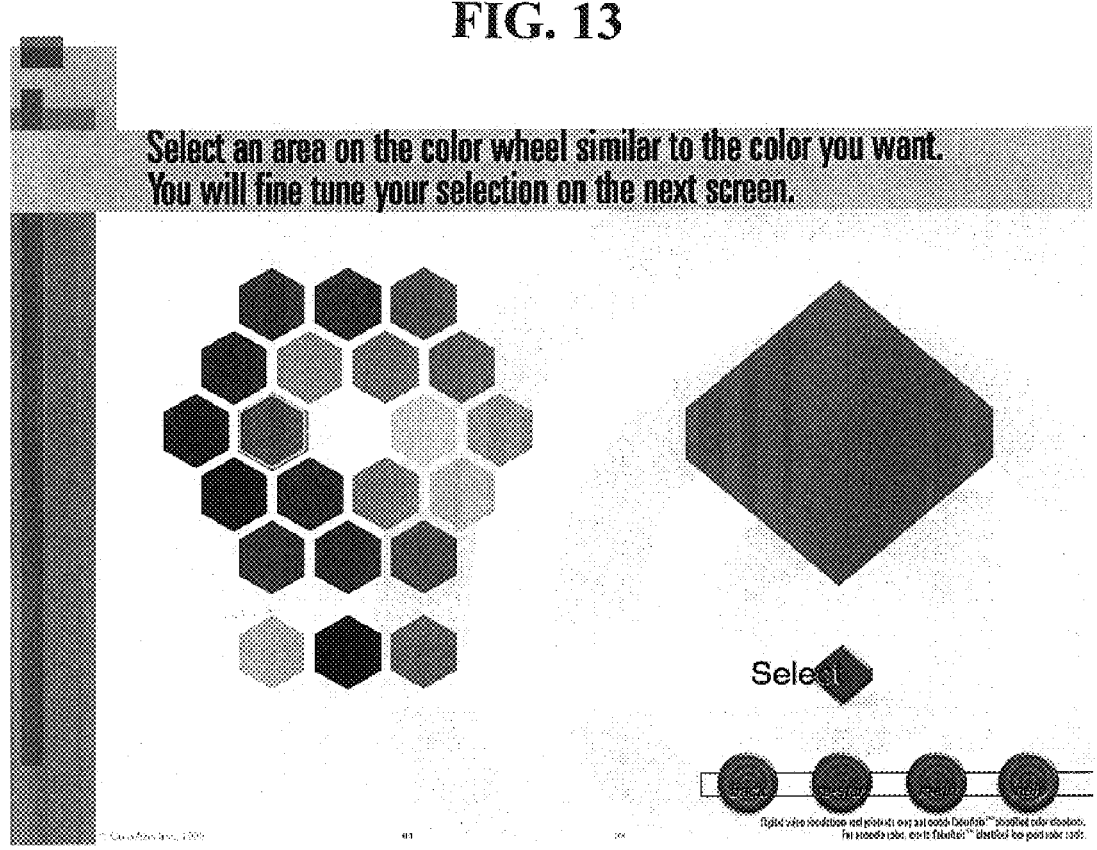
FIG. 13 is a view of a sample monitor screen generated by a computer program according to the flowchart of FIG. 11, in which the user is prompted to select a general color group.

The display 52 can display some or all of the colors within the architectural paint color database 48. In one embodiment, the display 52 comprises a CRT or a flat matrix array screen. The colors shown on the screen can be controlled by a computer program stored on the memory 42. In a preferred embodiment of the invention, an input color selection computer program is provided which instructs the processor 40 to query the user for a color group display request (step 106). The processor sends a sampling of different colors to the screen 52, as shown, for example, in FIG. 13. The user has the option of selecting any of the displayed colors. Such a selection serves as a request to view a group of paint colors, such as a sampling of colors from a selected color space portion 50. Upon receiving the user's request (step 108), the processor 40 accesses the selected color groups from the database 48 and sends them to the screen 52 (step 110). If the user does not select any of the displayed colors, the processor sends another color group display request (step 112). In this manner, the user can selectively scroll through colors or color groups from the database 48. The user can then use the selector 54, such as a keyboard, mouse, touch-screen, or other data-entry means, to select a displayed color.

Figure 14:
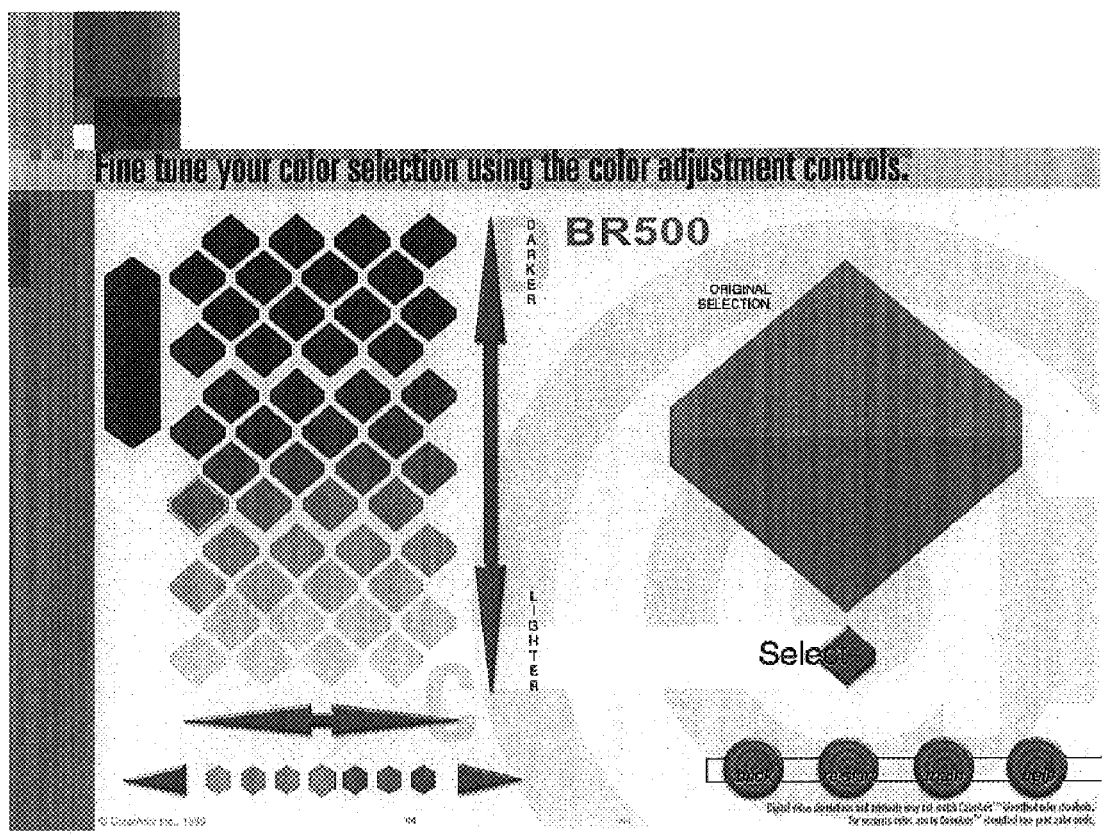
FIG. 14 is a view of a sample monitor screen generated by a computer program according to the flowchart of FIG. 11, in which the user is given the option of fine-tuning a color selection.

Preferably, the user is given the option to fine-tune his or her color selection. FIG. 14 shows a sample monitor screen offering the user the option to fine tune the color selection. Displayed on the screen are a sampling of different paint colors having substantially the same hue as the color selected from the screen of FIG. 13. The colors displayed on the screen of FIG. 14 preferably comprise a two-dimensional array of colors spanning ranges of value and chroma that are particularly suited for architectural paint. Advantageously, the user is given a wide selection of colors to choose from. The user can adjust the value or chroma of the entire display of colors by clicking on the arrows. For example, in the illustrated embodiment, the user can adjust the value of all of the colors on the display by clicking on the arrows labeled "darker" and "lighter." Also, the screen of FIG. 14 preferably has a color comparison portion, as shown on the right in the illustrated embodiment, wherein the user can compare a presently selected color with a previously selected color. Eventually, the user settles on a color as the input reference color. In alternative embodiments, the display 52 may comprise a display card or board showing paint colors of the database 48. In these embodiments, the colors may be numbered to allow the user to select an input reference color by inputting one of the numbers into the system 36.

Figure 15:
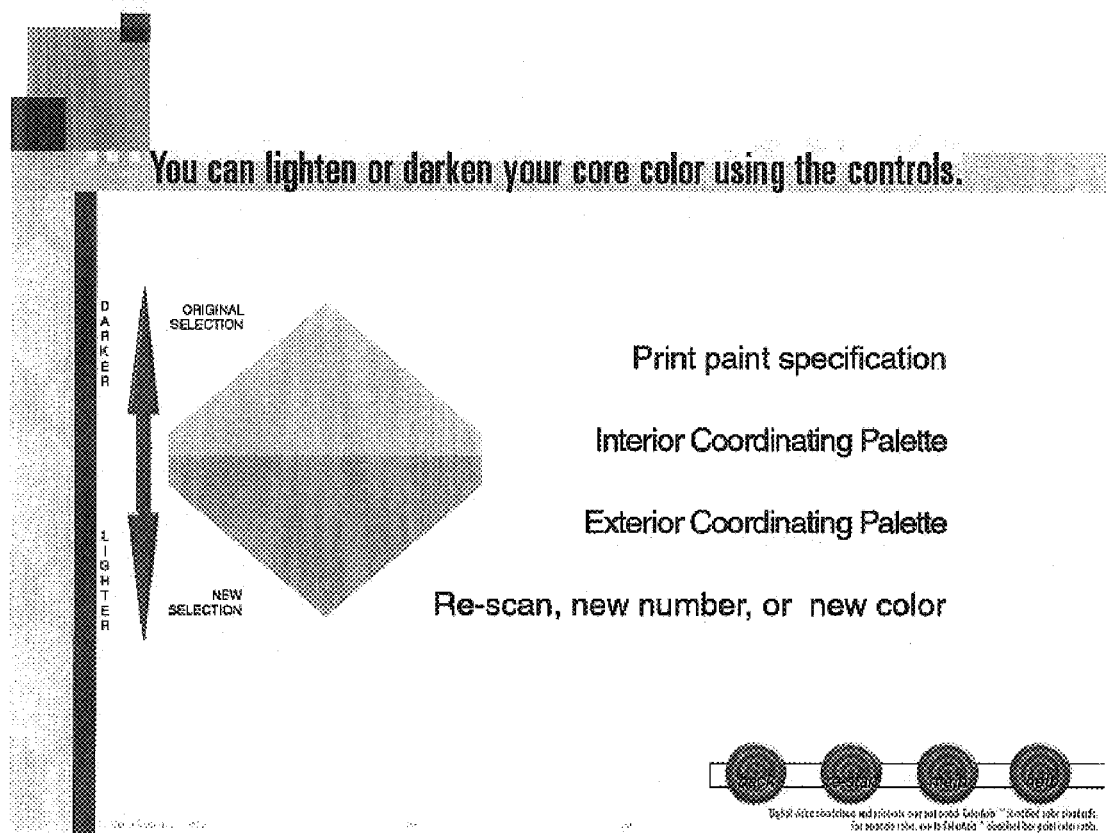
FIG. 15 is a view of a sample monitor screen generated by a computer program according to the flowchart of FIG. 11, in which the user is given the option of adjusting the value (lightness) of a selected color.

FIG. 15 shows a sample monitor screen in which the user can adjust the value of a selected color, and compare the adjusted color to the original color, by clicking on the arrows labelled "lighter" and "darker."

One problem that may occur as a result of using a television monitor or flat matrix array screen as the display 52 is that the displayed colors may not accurately depict the displayed paint colors. Also, different monitors may have different settings (e.g., brightness, contrast, etc.) which may result in non-uniformity of displayed colors between the different monitors. For these reasons, the monitors are preferably calibrated periodically to a standard setting. Also, high quality video cards are preferably used to produce a more accurate display.

In one optional aspect of the system 36, the user can also choose to select an input reference color by entering a color identification code that identifies a color based upon an alternative color reference system or database (step 114). This feature is helpful to users that are familiar with other color reference systems. For example, the user may wish to enter a code based upon a well-known color reference system used by a company that sells goods provided in a spectrum of colors, such as textiles, inks, or paint. The input color selection program can provide this option to the user. Accordingly, the memory 42 includes color information of colors within various alternative color reference systems. In addition, for every color within such alternative color reference systems, the memory 42 includes an indication of the architectural paint color within the paint color database 48 that is visually closest to it, with respect to a color-order system. For example, the memory may include a look-up table indicating which database paint color is closest in hue, value, and chroma or, alternatively, closest in CIELAB coordinates, to the input reference color selected from the alternative color reference system.

Figure 16:
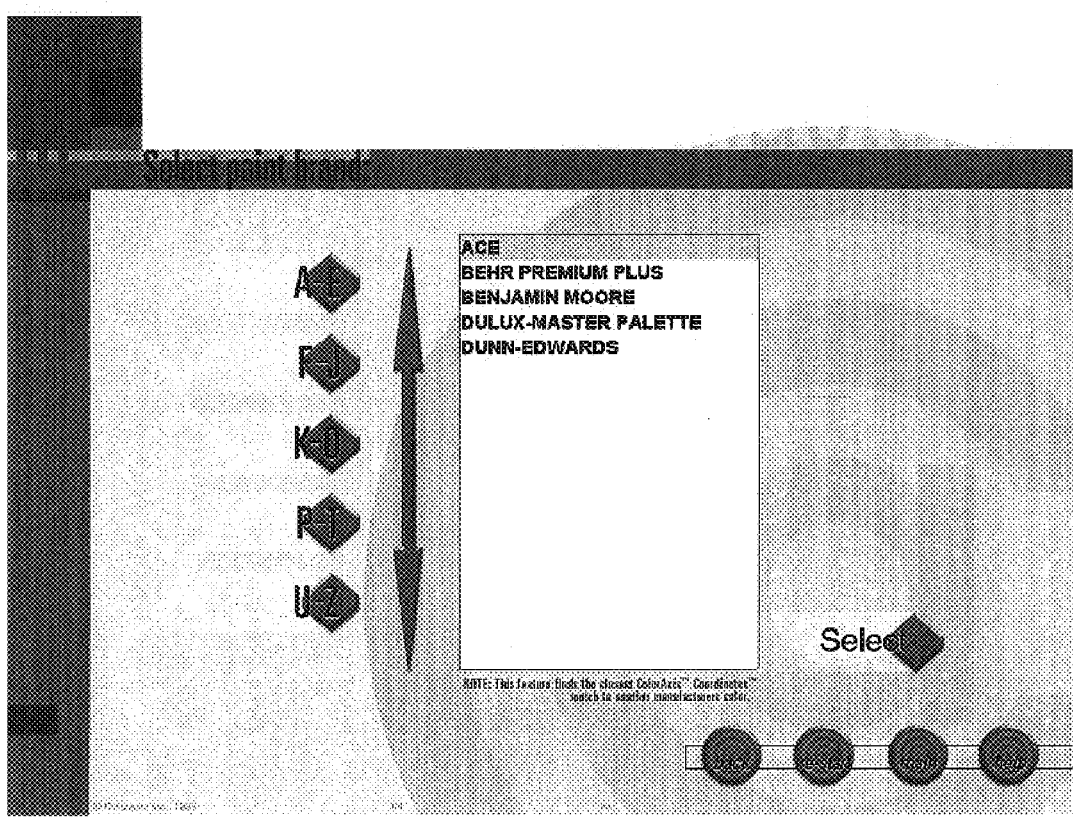
FIG. 16 is a view of a sample monitor screen generated by a computer program according to the flowchart of FIG. 11, displaying a selection of alternative color reference systems from which the user may choose an input reference color.

According to this method, the processor 40 requests the user to select an alternative color-reference system (step 116), such as, for example, one used by a paint company. The user chooses from a selection of such alternative color reference systems or databases stored in the memory 42. FIG. 16 shows a sample monitor screen providing the user a selection of alternative color reference systems. Upon receiving the user's selection (step 118), the processor requests a color identification code that identifies a color of the selected color-reference system (step 120). The user can then enter a color identification code based on the chosen alternative color reference system, to identify the input reference color. The processor receives the user's color selection (step 122) and searches the memory 42 to find the input reference color. The processor then finds the paint color within the paint color database 48 that is the closest match to the input reference color (step 124). In other words, the input reference color may not exactly correspond with an architectural paint color in the database 48, due to the arbitrary selection of colors in the different color-reference systems. Therefore, the processor 40 finds the closest match. The paint color that the processor selects from the database is the reference paint color.

Figure 17:
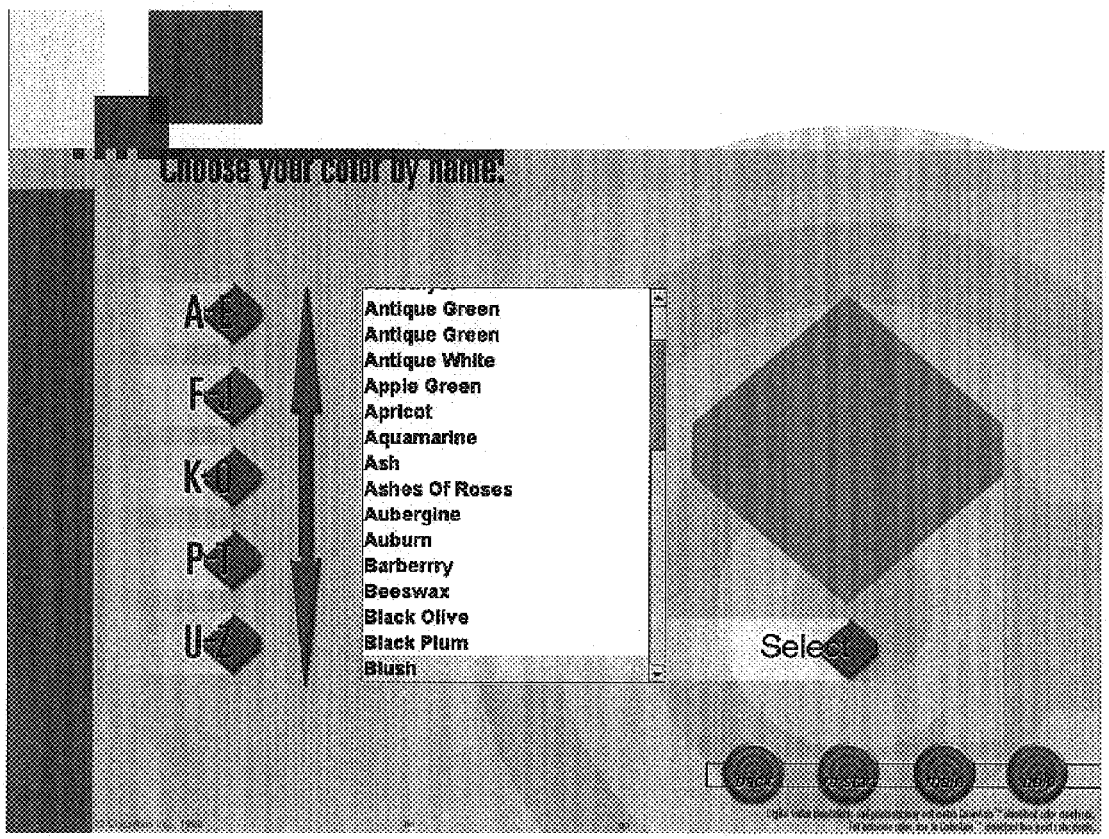
FIG. 17 is a view of a sample monitor screen generated by a computer program according to the flowchart of FIG. 11, displaying a selection of common color names which the user may choose as an input reference color.

In another optional aspect of the system 36, the user can also choose to select the input reference color by entering a common color name (e.g., "Blush") (step 126). The memory 42 includes a database of common color names which correspond to architectural paint colors within the database 48. According to this method, the processor 40 requests the user to select or enter a color name (step 128) as the input reference color. The user simply chooses from a displayed selection of such color names. FIG. 17 shows a sample monitor screen providing the user with a selection of common color names. Alternatively, the user can enter a color name, which may or may not be known by the system 36. Upon receiving the user's selection (step 130), the processor 40 reads which paint color from the database 48 corresponds to the input reference color (step 132). The corresponding paint color is the reference paint color.

Figure 18:
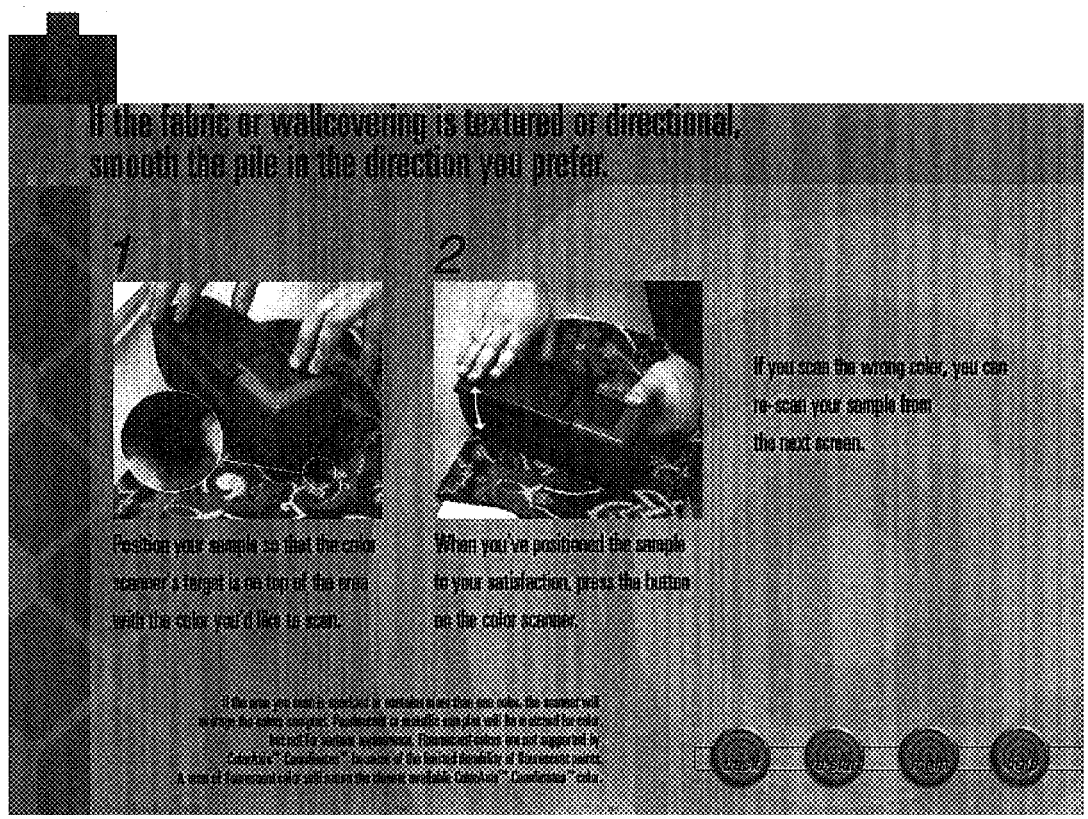
FIG. 18 is a view of a sample monitor screen generated by a computer program according to the flowchart of FIG. 11, instructing the user how to scan an input reference color into the system from a physical sample.

In another optional aspect of the system 36, the user can choose to scan the input reference color into the system 36 from a physical specimen, such as a paper, cloth, carpet, etc (step 134). Accordingly, the processor 40 requests the user to scan the input reference color into the system 36 (step 136). The interface 38 preferably includes a spectrophotometer, a device which can read color from a physical specimen and determine the color's hue, value, and chroma. The user uses the spectrophotometer to scan the input reference color into the system 36. To scan a color into the system 36, the user simply places a portion of the specimen under a scanning region of the spectrophotometer, said portion having the color which is desired to be scanned. The input color selection program preferably allows the user to directly control the spectrophotometer via a mouse, keyboard, touch-screen, or other control. Once activated, the spectrophotometer analyzes the color under the scanning region, i.e., the input reference color, to determine its color information. FIG. 18 shows a sample monitor screen instructing the user how to scan a color into the system. Upon receiving the scanned color (step 138), the processor searches the paint color database 48 to find an architectural paint color that is the closest match to the input reference color (step 140). The closest match from the database 48 is the reference paint color. In one embodiment, a SpectroEye TM, manufactured by Gretag Macbeth of New Windsor, N.Y., is used to scan the input reference color. The SpectroEye TM provides D65 CIELAB coordinates of the input reference color, which are compared with D65 CIELAB coordinates of the paint colors stored in the database 48.

Once the input reference color is received by the interface 38, the processor 40 determines the reference paint color as described above, depending on the method by which the input reference color is selected by the user. At this point the processor 40 has determined the color information of the reference paint color. The processor 40 is configured to perform complementary color selection instructions 46, i.e., a program, stored in the memory 42 (FIG. 6). The instructions 46 direct the processor 40 to select complementary architectural paint colors in the following manner: The processor 40 determines a first hue (step 142), which is one of the hues comprising the five-way harmony of the hue of the reference paint color selected by the user. The processor 40 then determines a first color space portion (step 144), defined as the color space portion 50 that includes the first hue. The processor 40 selects from the paint color database 48 a first set of architectural paint colors located within the first color space portion (step 146). Finally, the processor 40 directs the display generator 44 to generate an output display including color samples of the first set of architectural paint colors (step 150). In addition, the display generator can be directed to include within the display a color sample of the reference paint color selected by the user.

The instructions 46 may advantageously direct the processor 40 to execute the same sequence of steps for each of the other four hues that comprise the five-way harmony of the hue of the reference paint color (step 148). Accordingly, the processor 40 determines second, third, fourth, and fifth hues which collectively, along with the first hue, comprise the five-way harmony of the hue of the reference paint color. The processor 40 determines second, third, fourth, and fifth color space portions, defined as the color space portions 50 that include the second, third, fourth, and fifth hues, respectively. The processor 40 selects from the paint color database 48 second, third, fourth, and fifth sets of architectural paint colors located within the second, third, fourth, and fifth color space portions, respectively. Finally, the processor 40 directs the display generator 44 to generate color samples of the second, third, fourth, and fifth sets of architectural paint colors. If desired, the display generator 44 can generate a single output display including color samples of all of the first through fifth sets of architectural paint colors.

In addition to complementary architectural paint colors, the user may wish to see some color samples having the same or nearly the same hue as the reference paint color, yet having different values and chroma. The instructions 46 may advantageously direct the processor 40 to select several color samples from within the same color space portion 50 of the reference paint color selected by the user. In accordance with this feature, the processor 40 determines a sixth color space portion defined as the color space portion 50 which includes the reference paint color. The processor 40 selects from the paint color database 48 a sixth set of architectural paint colors located within the sixth color space portion. Finally, the processor 40 directs the display generator 44 to generate an output display including color samples of the sixth set of architectural paint colors. If desired, the display generator 44 can generate a single display including samples from all six sets described above. In this manner, the output display will show colors from within the entire six-way harmony that includes the reference paint color selected by the user.

All of the color samples generated by the system 36 are advantageously selected from within particular color space portions 50 as described above. With respect to value and chroma, the size of such color space portions is only limited by the ability to produce architectural paint colors. However, the user may wish to see color samples that have the same or nearly the same value and chroma as the reference paint color. In selecting each of the aforementioned sets of architectural paint colors, the processor 40 can be directed to select paint colors from within either (1) the entire space of the source color space portion, or, more narrowly, (2) the space within a predetermined or user-specified range of value and chroma which may or may not include the value and chroma of the reference paint color. For example, in selecting the first set of complementary paint colors, the processor 40 can be instructed to select colors from (1) the entire first color space portion, or from (2) a sub-portion of the first color space portion, the sub-portion including a range of value and chroma which may or may not include the value and chroma of the reference paint color. An advantage of selecting samples from a sub-portion that contains the value and chroma of the reference paint color is that the output display sample colors will generally be nearer to the lightness and brightness levels of the reference paint color, as may be desired by the user. The selected color samples are preferably selected so that the values and chroma thereof "surround" the value and chroma of the reference paint color. In this case, the total value range of the selected color samples is preferably less than 60, more preferably less than 50, more preferably less than 40, more preferably less than 30, more preferably less than 20, and even more preferably less than 10. The total chroma range of the selected color samples is preferably less than 60%, more preferably less than 50%, more preferably less than 40%, more preferably less than 30%, more preferably less than 20%, and even more preferably less than 10% of the entire known chroma range at the desired value and hue.

Figure 19:
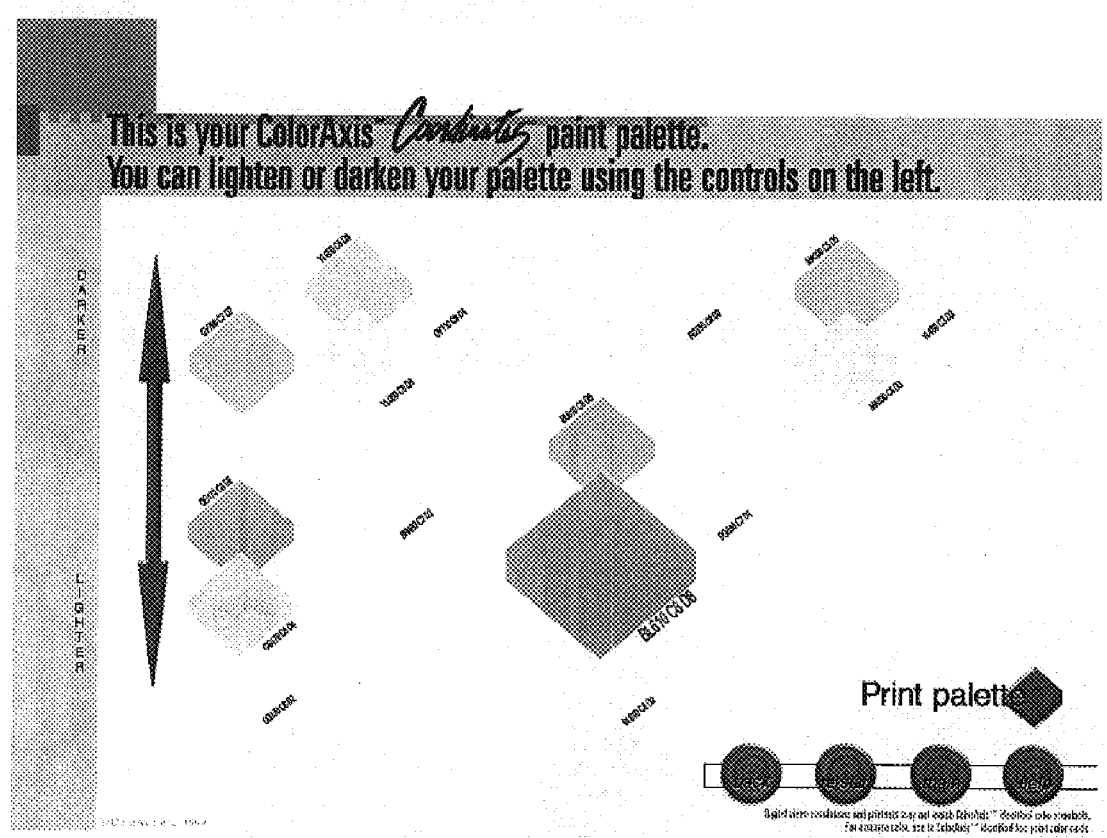
FIG. 19 is a view of a sample monitor screen generated by a computer program according to the flowchart of FIG. 11, displaying one embodiment of a palette of harmonious paint colors.
Figure 20:
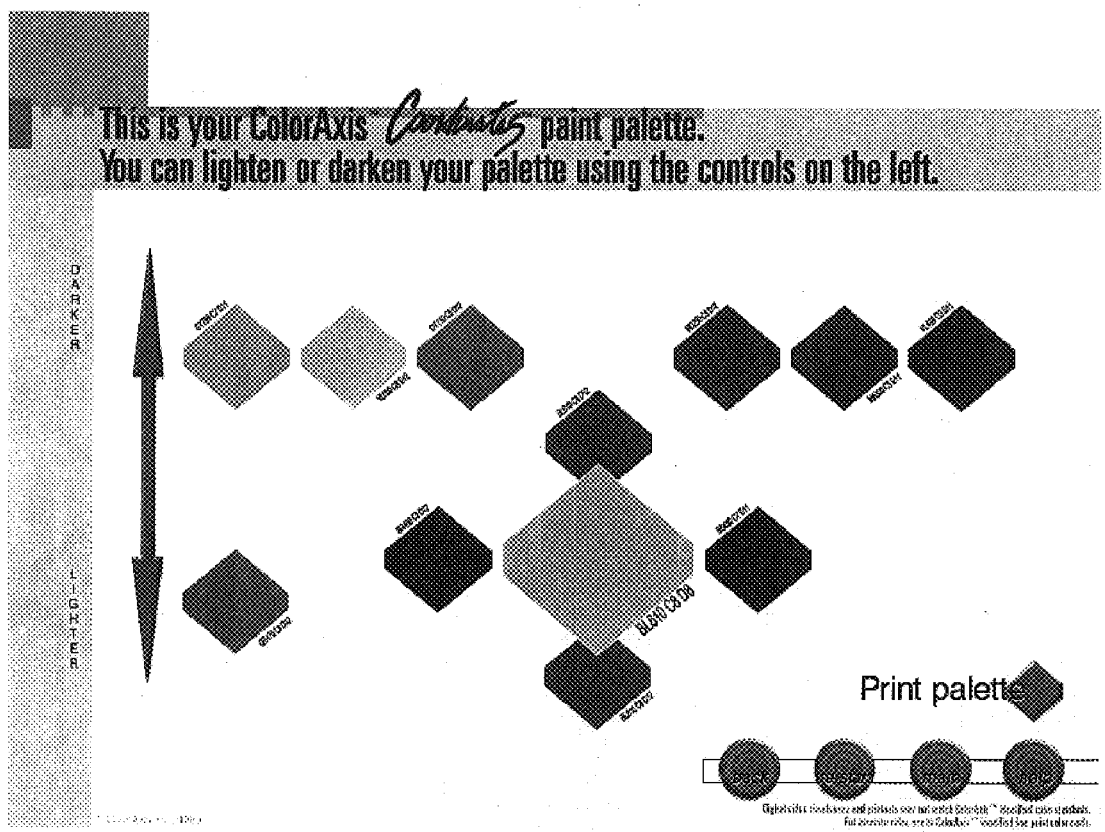
FIG. 20 is a view of a sample monitor screen generated by a computer program according to the flowchart of FIG. 11, displaying an alternative embodiment of a palette of harmonious paint colors.

The display generator 44 can be any device which creates an output display of color samples of architectural paint colors. The output display can be provided on the monitor display 52. FIGS. 19 and 20 show two different embodiments of a sample monitor screen showing an output display or palette of architectural paint color samples according to the invention. In this embodiment, the relatively larger color sample in the center of the display is the reference paint color, and the smaller samples are complementary and/or matching paint colors. In the illustrated embodiments, arrows labelled "lighter" and "darker" are provided, which the user can click on to modify the value of the entire palette. Similar arrows can be provided to adjust the chroma of the entire palette, as well.

The display generator 44 may also be configured to create a hard-copy display which the user can keep for future reference. Preferably, the hard-copy display is relatively small and light-weight. The paint color samples in the hard-copy display can be arranged in any suitable manner, such as shown in FIG. 19, giving due consideration to the goal of displaying the colors so that they can be easily compared and contrasted. In one embodiment, the display generator 44 comprises an inkjet color printer which prints ink-based color samples which are replications of paint color samples. An advantage of using an inkjet color printer to print ink-based color samples is that it is relatively inexpensive compared to generating paint-based color samples. Preferably, the paint color samples are printed on pure white or nearly pure white paper, to minimize any effect of the paper color on the color samples. Of course, a display generator 44 which is capable of generating paint-based color samples can be used in the system 36, if desired.

In addition to those described above, there are many different complementary color selection and display modes possible for the system 36. For instance, in addition to the complements of the input reference color, the user may wish to view (1) colors having values and chromas that are somewhat offset from those of the input reference color, or (2) colors having hues which are somewhat offset from a hue of the six-way harmony of the hue of the input reference color. For example, the user may wish to view a color which is complementary to and has the same chroma as the input reference color, but has a somewhat higher or lower value. As another example, the user may wish to view a color which is complementary to, and has the same value as, the input reference color, but has a somewhat higher or lower chroma. Perhaps the user will wish to view a color which has the same value and chroma as the input reference color, but whose hue is somewhat varied from a hue which is complementary to that of the input reference color. Such offsetting of hue, value, and chroma may be done for each of the hues comprising the six-way harmony that includes the hue of the input reference color.

Such different color selection and display modes may be implemented as follows: The instructions 46 direct the processor 40 to select and display pairs of paint colors, as defined below. For every color in the database 48, there is assigned a predetermined range of hue, a predetermined range of value, and a predetermined range of chroma. Such ranges include the hue, value, and chroma, respectively, of the particular color for which such ranges are assigned. Upon receiving an input reference color, the processor 40 selects from the database 48 a reference paint color which is visually closest to it, i.e., closest in hue, value, and chroma. The reference paint color has a reference hue, reference value, and reference chroma. The processor determines a "complementary hue," a hue that is five-way harmonious with the reference hue. The processor then selects from database 48 the color which is closest to the complementary hue, reference value, and reference chroma. This color will be referred to herein as a "matching complementary color." The matching complementary color is essentially complementary to the reference paint color, and has substantially the same lightness and brightness levels. For any given reference paint color, there is one matching complementary color for every complementary hue.

Then, the processor 40 selects from the database 48 a pair of "offset colors," including a "first offset color" and a "second offset color." The pair of offset colors is within and at or near the endpoints of one of the predetermined ranges associated with the matching complementary color. In one embodiment, the offset colors have different hues. The first offset color has a hue substantially equivalent to a first endpoint of the predetermined range of hue corresponding to the matching complementary color. The second offset color has a hue substantially equivalent to a second endpoint of the same predetermined range. The term "endpoints" refers to the hues at the ends of the predetermined range of hue. The hues of the first and second offset colors are preferably within the predetermined range of hue and on opposite "sides" of the complementary hue. The value and chroma of the first and second offset colors may be substantially equal to the reference value and reference chroma, respectively. The processor 40 preferably directs display generator 44 to create an output display including at least one of the first and second offset colors. Advantageously, the user can view colors which have equivalent lightness and brightness levels as the input reference color, and which have hues slightly offset from a hue that is complementary to that of the input reference color.

Preferably, the hues of the first and second offset colors are visually similar to the complementary hue (or reference hue, as described below) from which they are offset. For example, if the complementary hue is generally blue, it may undesirable for the processor to select an offset color that is generally green or indigo. Thus, each paint color in the database 48 preferably has a predetermined range of hue which remains within the same general hue. In one preferred embodiment, each predetermined range of hue remains within one of the seven hue families defined by the acronym ROYGBIV (red, orange, yellow, green, blue, indigo, and violet), which defines the generalized sequence of hues located about the value axis 20 (FIG. 1). In another preferred embodiment, if there are 90 color space portions 50 (FIG. 7), each predetermined range of hue preferably extends to no more than twelve, more preferably to no more than three, more preferably to no more than two, and even more preferably to no more than one color space portion $50_i$ on either side of the color space portion in which the complementary hue (or reference hue) resides. For example, if the complementary hue is in color space portion $50_{10}$, the offset colors may preferably reside in color space portions not farther away than color space portions $50_7$ and $50_{13}$. In yet another preferred embodiment, the hues of the offset colors vary from the hue of the matching complementary color preferably by less than 48°, more preferably less than 42°, more preferably less than 36°, more preferably less than 30°, more preferably less than 24°, more preferably less than 18°, and even more preferably less than 12° about the value axis 20.

In another embodiment, the offset colors have different values. The first offset color has a value substantially equal to a first endpoint of the predetermined range of value corresponding to the matching complementary color. The second offset color has a value substantially equal to a second endpoint of the same predetermined range. The values of the first and second offset colors are preferably within the predetermined range of value, one of such values being higher and the other being lower than the reference value. The hue and chroma of the first and second offset colors are substantially equal to the complementary hue and reference chroma, respectively. The processor 40 preferably directs display generator 44 to create an output display including at least one of the first and second offset colors. Advantageously, the user can view colors which are complementary to and have substantially the same brightness as the input reference color, and which are slightly darker or lighter than the input reference color. In a preferred embodiment, the values of the offset colors are preferably within 30, more preferably within 25, more preferably within 20, more preferably within 15, more preferably within 10, more preferably within 5, more preferably within 3, and even more preferably within 2 of the value of the matching complementary color.

In another embodiment, the offset colors have different chromas. The first offset color has a chroma substantially equal to a first endpoint of the predetermined range of chroma corresponding to the matching complementary color. The second offset color has a chroma substantially equal to a second endpoint of the same predetermined range. The chromas of the first and second offset colors are preferably within the predetermined range of chroma, one of such chromas being higher and the other being lower than the reference chroma. The hue and value of the first and second offset colors are substantially equal to the complementary hue and reference value, respectively. The processor 40 preferably directs display generator 44 to create an output display including at least one of the first and second offset colors. Advantageously, the user can view colors which are complementary to and have substantially the same lightness as the input reference color, and which are slightly duller or brighter than the input reference color. In a preferred embodiment, the chromas of the offset colors are within 30%, more preferably within 20%, and even more preferably within 10% of the chroma of the matching complementary color, wherein the listed percentages are percentages of the known chroma range at the hue and value of the matching complementary color.

The system 36 may also be configured to create an output display of colors which are somewhat varied from the hue, value, and chroma of the reference paint color, rather than those of the matching complementary color. In other words, the methods just described above may be modified so that the first and second offset colors are chosen with respect to the reference paint color, rather than the matching complementary color. For example, in one embodiment the first and second offset colors have different hues. Accordingly, the first offset color has a hue substantially equivalent to a first endpoint of the predetermined range of hue corresponding to the reference paint color, and the second offset color has a hue substantially equivalent to a second endpoint of the same predetermined range. The hues of the first and second offset colors are within the predetermined range of hue and on opposite "sides" of the reference hue. The value and chroma of the first and second offset colors are substantially equal to the reference value and reference chroma, respectively. The processor 40 preferably directs display generator 44 to create an output display including at least one of the first and second offset colors. Alternatively, the first and second offset colors can be chosen to have (1) values which differ from the reference value, and hue and chroma substantially equal to the reference hue and reference chroma, reaspectively, or (2) chromas which differ from the reference chroma, and hue and value substantially equal to the reference hue and reference value, respectively.

In addition to selecting paint colors that are complementary to a single input color, the system 36 may be configured so that the user has the option of entering or selecting two input colors. In other words, the system 36 may be configured to select paint colors that are complementary to a two-color scheme input. In one embodiment, the system 36 generates an output display including color samples of the five-way harmonies of each input color. In another embodiment, the system 36 takes averages the hues of the two input colors and generates a five-way harmony of the average hue. The same methods can be used for any multi-color scheme input, i.e., two or more input colors.

FIG. 21 shows one embodiment of an in-store kiosk version 60 of the paint color matching and coordinating system 36 of the present invention. As shown, the kiosk 60 includes a CRT monitor 52, a spectrophotometer 62, a computer unit 64, and a printer 66. The system 36 may be operated by a keyboard 68, mouse 70, and/or a touch-screen interface on the screen of the monitor 52. The computer unit 64 includes the previously described processor 40 and memory 42 storing the architectural paint color database 48 of the present invention. Advantageously, consumers can use the kiosk 60 while shopping to aid in the selection and coordination of architectural paint colors. Preferably, the display system described in the Display System Patent is provided in conjunction with the matching and coordinating system of the present invention, to further assist consumers in paint color selection.

Figure 22:
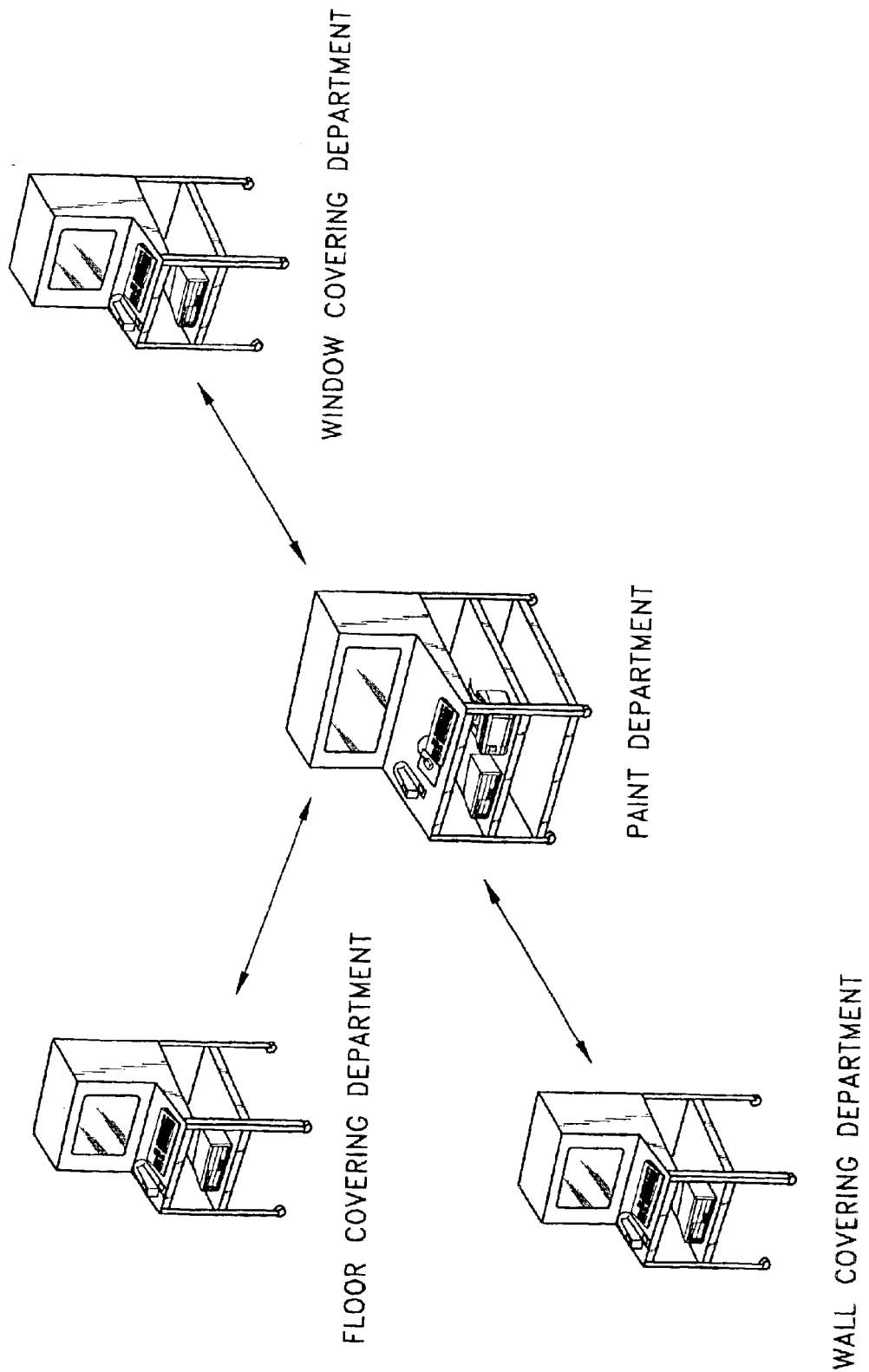
FIG. 22 is a schematic view of a multiple kiosk embodiment of the system of the present invention.

The kiosk system 60 of the present invention can be provided in multiple locations within a retail store. FIG. 22 illustrates this concept. A first kiosk is advantageously located within the paint department of the store. This kiosk may advantageously be networked with other satellite kiosks distributed throughout the remainder of the store, such as in the floor covering, window covering, and wall covering departments. In one embodiment, all of the satellite kiosks are scaled down versions of the paint department kiosk and include a computer, a screen which may advantageously be the same screen used for ringing up customer transactions, and a spectrophotometer. The satellite "kiosks" are electronically connected to the central paint department kiosk and may advantageously access the architectural paint color database 48. The satellite spectrophotometers are used to permit the scanning of physical samples, and the kiosk in the paint department has a printer for printing the paint color samples as described above. In another embodiment, all of the kiosks have printers. This multiple kiosk system provides the advantages of convenience and ease of shopping. For example, a consumer may be in the window covering department selecting a color of window covering. The consumer may desire to scan a physical sample of the selected window covering to determine complementary architectural paint colors. While in the window covering department of the store, the consumer can conveniently select paint colors that complement the chosen color of the window covering. The consumer does not have to take a physical sample of the window covering to the paint department to use the system.

The system 36 may be configured to receive one or more final paint color selections after the customer has decided to purchase one or more paints having selected paint colors. In this case, the customer may use the interface 38 to identify the selected paint colors and the quantities of which are desired for purchase. The system may be configured to send this information to a paint technician trained to operate a paint base/colorant mixing apparatus which produces the desired paint(s). Alternatively, the system may be configured to control the mixing apparatus to automatically produce the desired paint(s).

In another aspect of the invention, the system 36 resides in a store and is capable of providing a listing of items sold in the store whose colors are within an output palette of complementary paint colors generated by the system. According to this aspect of the invention, the database 48 contains color information of inventory contained within the store or within a network of stores. Such color information may be in the form of D65 CIELAB, LCH, or any of a variety of other suitable color reference systems. The color information preferably identifies one or more of the dominant colors of every item of inventory whose color information is included within database 48. The system is configured so that after a user directs the system 36 to generate an output palette of harmonious paint colors, as described above, the user can then query the system to provide a list of items sold in the store whose dominant colors are within or near the colors displayed on the output palette. Upon receiving the query, the system compares the colors on the output palette to the colors of the inventory stored in the database, and selects those items whose colors are within a predetermined tolerance of any of the colors on the output palette. For example, a user may direct the system to generate an output palette of harmonious paint colors that the user intends to use to paint the interior of a bathroom. The system can then provide a listing of store inventory, such as bath towels, pottery, or rugs, whose colors are harmonious with the paint colors of the output palette.

It will be understood by those skilled in the art that the system 36 of the present invention may be implemented outside of the paint retail store environment. For example, the system 36 can be implemented on a network server so that a user can access the system over a local area network (LAN), a wide area network (WAN), or the internet. For example, the system may be accessible over the internet so that a user may access the system from a home or office computer. All of the above-described features can be included. For example, the appropriate architectural paint colors can be downloaded from the database 44 to the user's monitor display. The user can select an input reference color by (1) selecting a paint color from the database 48, (2) inputting a color identification code from a known color reference system, (3) inputting or selecting a common color name, or (4) if the user has a spectrophotometer, scanning a color into the system 36 from a physical specimen. Finally, the user can obtain a hard-copy printout of paint colors if the user has a suitable printer. The settings for the printer and the monitor could be sent to the user's computer for automatically preparing the user's computer monitor and printer for the truest possible color viewing.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Thus, it is intended that the scope of the present invention herein disclosed should not be limited by the particular disclosed embodiments described above, but should be determined only by a fair reading of the claims that follow.

What is claimed is:

1. A method of generating a display of complementary paint color samples, comprising:

receiving an input reference color having a reference hue;

selecting a first narrow range of hues encompassing a first hue that is complementary to said reference hue;

displaying one or more separate and individually selectable color samples of architectural paint colors having hues within said first narrow range of hues on an output display comprising one of a display monitor and a hard-copy printout; and monitoring for a selection of one or more of the color samples on the output display;

wherein said first hue is one of the hues comprising a five-way harmony of said reference hue.

2. The method of claim 1, further comprising:

selecting a second narrow range of hues encompassing a second hue that is five-way harmonious with respect to said reference hue, the second narrow hue range not overlapping with the first narrow hue range;

selecting a third narrow range of hues encompassing a third hue that is five-way harmonious with respect to said reference hue, the third narrow hue range not overlapping with either of the first and second narrow hue ranges;

displaying on the output display one or more separate and individually selectable color samples of architectural paint colors having hues within said third narrow range of hues;

selecting a fourth narrow range of hues encompassing a fourth hue that is five-way harmonious with respect to said reference hue, the fourth narrow hue range not overlapping with any of the first, second, and third narrow hue ranges;

displaying on the output display one or more separate and individually selectable color samples of architectural paint colors having hues within said fourth narrow range of hues;

selecting a fifth narrow range of hues encompassing a fifth hue that is five-way harmonious with respect to said reference hue, the fifth narrow hue range not overlapping with any of the first, second, third, and fourth narrow hue ranges; and displaying on the output display one or more separate and individually selectable color samples of architectural paint colors having hues within said fifth narrow range of hues.

3. The method of claim 2, further comprising:

selecting a sixth narrow range of hues encompassing said reference hue, the sixth narrow hue range not overlapping with any of the first, second, third, fourth, and fifth narrow hue ranges; and displaying on the output display one or more separate and individually selectable color samples of architectural paint colors having hues within said sixth narrow range of hues.

4. The method of claim 1, wherein displaying said one or more color samples on said output display is accomplished at a remote location.

5. The method of claim 1, wherein displaying said one or more color samples comprises transmitting data representative of said color samples over the Internet.

6. The method of claim 1, further comprising receiving a selection of one of said one or more color samples.

7. The method of claim 6, further comprising producing architectural paint having the color of said selected one of said one or more color samples.

8. The method of claim 1, wherein receiving the input reference color comprises receiving a color identification code based on a known color reference system.

9. The method of claim 1, further comprising adjusting the reference hue prior to selecting the first narrow range of hues.

10. The method of claim 1, further comprising adjusting the hue of at least one of the one or more color samples.

11. The method of claim 1, further comprising adjusting a value setting of the input reference color.

12. The method of claim 1, further comprising adjusting a value setting of at least one of the one or more color samples.

13. The method of claim 1, further comprising adjusting a chroma setting of the input reference color.

14. The method of claim 1, further comprising adjusting a chroma setting of at least one of the one or more color samples.

15. The method of claim 1, further comprising displaying, on said output display, text identifications of said one or more color samples displayed on said output display.

16. A method of generating a display of complementary paint color samples, comprising:

receiving an input reference color having a reference hue;

selecting a first narrow range of hues encompassing a first hue that is complementary to said reference hue;

displaying one or more separate and individually selectable color samples of architectural paint colors having hues within said first narrow range of hues on an output display comprising one of a display monitor and a hard-copy printout; and monitoring for a selection of one or more of the color samples on the output display;

wherein said first hue is a split-complement of said reference hue.

17. The method of claim 16, further comprising:

selecting a second narrow range of hues encompassing a second hue which is a split-complement of said reference hue, said second narrow hue range not overlapping with said first narrow hue range; and displaying on the output display one or more separate and individually selectable color samples of architectural paint colors having hues within said second narrow range of hues.

18. The method of claim 17, further comprising:

selecting a third narrow range of hues encompassing said reference hue, said third narrow hue range not overlapping with either of the first or second narrow hue ranges; and displaying on the output display one or more color samples of architectural paint colors having hues within said third narrow range of hues.

19. An architectural paint color coordination system for selecting complementary architectural paint colors, comprising:

an interface for receiving an input reference color;

a processor configured to perform instructions read from a memory;

a memory storing instructions configured to be read and performed by said processor; and a display generator;

wherein said instructions direct said processor to perform the steps of:

directing said interface to receive an input reference color having a reference hue;

selecting a first narrow range of hues encompassing a first hue that is five-way harmonious with respect to said reference hue;

directing said display generator to display one or more separate and individually selectable color samples of architectural paint colors having hues within said first narrow range of hues; and monitoring for a selection of one or more of the color samples displayed by the display generator.

20. The system of claim 19, wherein said instructions direct said processor to perform the further steps of:

selecting a second narrow range of hues encompassing a second hue that is five-way harmonious with respect to said reference hue, the second narrow hue range not overlapping with the first narrow hue range; and selecting a third narrow range of hues encompassing a third hue that is five-way harmonious with respect to said reference hue, the third narrow hue range not overlapping with either of the first and second narrow hue ranges;

selecting a fourth narrow range of hues encompassing a fourth hue that is five-way harmonious with respect to said reference hue, the fourth narrow hue range not overlapping with any of the first, second, and third narrow hue ranges;

selecting a fifth narrow range of hues encompassing a fifth hue that is five-way harmonious with respect to said reference hue, the fifth narrow hue range not overlapping with any of the first, second, third, and fourth narrow hue ranges; and directing said display generator to display separate and individually selectable color samples of architectural paint colors having hues within said first, second, third, fourth, and fifth narrow hue ranges.

21. The system of claim 20, wherein said instructions further direct said processor to perform the steps of:

selecting a sixth narrow range of hues encompassing said reference hue, said sixth narrow hue range not overlapping with any of the first, second, third, fourth, and fifth narrow hue ranges; and directing said display generator to display separate and individually selectable color samples of architectural paint colors having hues within said first, second, third, fourth, fifth, and sixth narrow hue ranges.

22. An inventory selection system, comprising:

a storage containing color information of a palette of harmonious paint colors;

a database of merchandise items, said database containing color information of said merchandise items;

a processor in communication with said storage to read said color information of said harmonious paint colors and with said database to read said color information of said merchandise items, said processor being configured to select merchandise items from said database whose color information is within a predetermined tolerance of the color information of any of said harmonious paint colors;

an architectural paint color selection system configured to generate an output display of said harmonious paint colors; and one or more kiosks, at least one of the kiosks being configured to receive an input reference color having a reference hue and send said reference hue to said architectural paint color selection system, wherein said architectural paint color selection system is configured to select additional hues that are five-way harmonious with respect to said reference hue, said architectural paint color selection system configured to include in said output display separate and individually selectable architectural paint color samples having hues that are substantially the same as said additional hues.

23. The system of claim 22, wherein said one or more kiosks are in a retail store.

24. The system of claim 22, wherein said at least one of said kiosks is configured to receive said input reference color from a scan of a physical sample by a scanner.

25. The system of claim 24, wherein said scanner comprises a spectrophotometer.

26. The system of claim 22, wherein said at least one of said kiosks is configured to receive said input reference color by displaying a sampling of architectural paint colors and receiving a selection of one of the colors of said sampling.

27. The system of claim 22, wherein said at least one of said kiosks is configured to receive said input reference color by receiving a color identification code based upon a known color reference system.

28. The system of claim 22, wherein said at least one of said kiosks is configured to receive said input reference color by receiving a common color name.

29. The system of claim 22, wherein said architectural paint color selection system is configured to send said output display of harmonious paint colors to a remote device, said remote device comprising one of a display monitor and a printer.

* * * * *